United States Patent
Alshina et al.

(10) Patent No.: US 9,407,917 B2
(45) Date of Patent: Aug. 2, 2016

(54) VIDEO ENCODING METHOD WITH BIT DEPTH ADJUSTMENT FOR FIXED-POINT CONVERSION AND APPARATUS THEREFOR, AND VIDEO DECODING METHOD AND APPARATUS THEREFOR

(75) Inventors: Elena Alshina, Suwon-si (KR); Alexander Alshin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 167 days.

(21) Appl. No.: 14/130,080

(22) PCT Filed: Jul. 2, 2012

(86) PCT No.: PCT/KR2012/005244
§ 371 (c)(1),
(2), (4) Date: Dec. 30, 2013

(87) PCT Pub. No.: WO2013/002619
PCT Pub. Date: Jan. 3, 2013

(65) Prior Publication Data
US 2014/0140411 A1   May 22, 2014

Related U.S. Application Data

(60) Provisional application No. 61/503,017, filed on Jun. 30, 2011.

(51) Int. Cl.
*H04N 19/115*   (2014.01)
*H04N 19/18*   (2014.01)
(Continued)

(52) U.S. Cl.
CPC ............ *H04N 19/122* (2014.11); *G06F 17/147* (2013.01); *H04N 19/0006* (2013.01);
(Continued)

(58) Field of Classification Search
None
See application file for complete search history.

(56) References Cited

U.S. PATENT DOCUMENTS 6,606,039 B2   8/2003   Hirano et al.
7,185,037 B2   2/2007   Zhou
(Continued)

FOREIGN PATENT DOCUMENTS

CN   1585489 A   2/2005
CN   101083768 A   12/2007
(Continued)

OTHER PUBLICATIONS

Communication dated Jul. 29, 2015 issued by Taiwanese Intellectual Property Office in counterpart Taiwanese Application No. 101123850.
(Continued)

*Primary Examiner* — Christopher S Kelley
*Assistant Examiner* — Kaitlin A Retallick
(74) *Attorney, Agent, or Firm* — Sughrue Mion, PLLC

(57) ABSTRACT

Provided are a video encoding method of adjusting a range of encoded output data to adjust a bit depth during restoring of encoded samples, and a video decoding method of substantially preventing overflow from occurring in output data in operations of a decoding process. The video decoding method includes parsing and restoring quantized transformation coefficients in units of blocks of an image from a received bitstream, restoring transformation coefficients by performing inverse quantization on the quantized transformation coefficients, and restoring samples by performing one-dimensional (1D) inverse transformation and inverse scaling on the quantized transformation coefficients. At least one from among the transformation coefficients and the samples has a predetermined bit depth or less.

4 Claims, 13 Drawing Sheets

(51) Int. Cl.
| | |
|---|---|
| *H04N 19/146* | (2014.01) |
| *H04N 19/60* | (2014.01) |
| *H04N 19/122* | (2014.01) |
| *H04N 19/126* | (2014.01) |
| *H04N 19/184* | (2014.01) |
| *H04N 19/44* | (2014.01) |
| *H04N 19/42* | (2014.01) |
| *G06F 17/14* | (2006.01) |
| *H04N 19/136* | (2014.01) |
| *H04N 19/182* | (2014.01) |

(52) U.S. Cl.
CPC ........... *H04N19/126* (2014.11); *H04N 19/146* (2014.11); *H04N 19/18* (2014.11); *H04N 19/184* (2014.11); *H04N 19/42* (2014.11); *H04N 19/44* (2014.11); *H04N 19/45* (2014.11); *H04N 19/60* (2014.11); *H04N 19/115* (2014.11); *H04N 19/136* (2014.11); *H04N 19/182* (2014.11)

(56) References Cited

U.S. PATENT DOCUMENTS

| | | | |
|---|---|---|---|
| 7,242,713 | B2 | 7/2007 | Srinivasan et al. |
| 7,269,288 | B2 | 9/2007 | Lin et al. |
| 7,483,581 | B2 | 1/2009 | Raveendran et al. |
| 7,613,345 | B2 | 11/2009 | Kajiwara et al. |
| 2003/0099291 | A1* | 5/2003 | Kerofsky ............... H03M 7/24 375/240.05 |
| 2003/0123553 | A1 | 7/2003 | Kerofsky |
| 2005/0047509 | A1 | 3/2005 | Lee et al. |
| 2005/0231641 | A1 | 10/2005 | Suito |
| 2006/0098881 | A1 | 5/2006 | Kim |
| 2006/0227867 | A1 | 10/2006 | Winger et al. |
| 2007/0297503 | A1* | 12/2007 | Reznik ................. G06F 17/147 375/240 |
| 2007/0299897 | A1 | 12/2007 | Reznik |
| 2008/0089417 | A1 | 4/2008 | Bao et al. |
| 2008/0260027 | A1 | 10/2008 | Karczewicz |
| 2009/0092330 | A1 | 4/2009 | Koroteev et al. |
| 2009/0110317 | A1 | 4/2009 | Alshina et al. |
| 2009/0147843 | A1 | 6/2009 | Han et al. |
| 2010/0027973 | A1 | 2/2010 | Cheng et al. |
| 2010/0054330 | A1 | 3/2010 | Chen et al. |
| 2010/0141489 | A1 | 6/2010 | Reznik |
| 2010/0312811 | A1 | 12/2010 | Reznik |
| 2012/0183044 | A1* | 7/2012 | Kerofsky ............. H04N 19/132 375/240.03 |
| 2012/0230405 | A1 | 9/2012 | An et al. |
| 2012/0307889 | A1 | 12/2012 | Kerofsky et al. |
| 2013/0114688 | A1* | 5/2013 | Kerofsky ............. H04N 19/126 375/240.03 |

FOREIGN PATENT DOCUMENTS

| | | |
|---|---|---|
| EP | 1 655 968 A2 | 5/2006 |
| JP | 11-266159 A | 9/1999 |
| JP | 2003333598 A | 11/2003 |
| JP | 3653172 B2 | 5/2005 |
| JP | 2006141016 A | 6/2006 |
| JP | 2011-109711 A | 6/2011 |
| KR | 10-2006-0042295 A | 5/2006 |
| KR | 1020070115552 A | 12/2007 |
| KR | 10-2009-0061249 A | 6/2009 |
| TW | 200850009 A | 12/2008 |
| TW | 201108743 A1 | 3/2011 |
| TW | 201116066 A1 | 5/2011 |
| TW | 201119250 A1 | 6/2011 |
| WO | 2012124787 A1 | 9/2012 |

OTHER PUBLICATIONS

Communication dated Sep. 8, 2015 issued by Japanese Intellectual Property Office in counterpart Japanese Patent Application No. 2014-518816.

Misra et al., "Enforcing the 16-bit inverse transform dynamic range", JCT-VC of ITU-T SG16 WP3 and ISO/IEC JTC1/SC29/WG11, 5th Meeting, Mar. 16-23, 2011, 6 pages total, SHARP, Geneva, CH, Document: JCTVC-E411.

Alshina et al., "CE10: Full-factorized core transform proposed by Samsung/FastVDO.", JCTVC-VC of ITU-T SG16 WP3 and ISO/IEC JTC1/SC29/WG11 6th Meeting, Jul. 14-22, 2011, 18 pages total, Samsung Electronics, Ltd, FastVDO, Torino, IT Document: JCTVC-F251.

Alshina et al., "AbG7: Overflow Prevention in HEVC inverse transform", JCT-VC of ITU-T SG16 WP3 and ISO/IEC JTC1/SC29/WG11 7th Meeting, Nov. 21-30, 2011, 17 pages total, Samsung Electronics Co., Ltd., Geneva, CH, Document: JCTVC-G782.

Communication dated Sep. 3, 2014 issued by the Korean Intellectual Property Office in counterpart Korean Patent Application No. 10-2012-0071973.

International Search Report (PCT/ISA/210) issued Dec. 27, 2012, in International Application No. PCT/KR2012/005244.

McCann (Zetacast / Samsung) K et al, "Video coding technology proposal by Samsung (and BBC)", 1. JCT-VC Meeting; Apr. 15, 2010-Apr. 23, 2010; Dresden; (Jointcollaborative Team on Video Coding of ISO/IEC JTC1/SC29/WG11 and ITU-TSG.16 ); URL: http://wftp3.itu.int/av-arch/jctvc-site/ , No. XP030007572, Jun. 1, 2010, XP030007573, pp. 1-42.

Lim J. S., "Two-dimensional signal and image processing, PASSAGE", Jan. 1, 1990, Two-Dimensional Signal and Image Processing, Upper Saddle River, NJ : Prentice Hall, US, XP002735768, p. 495-497 & 202-213.

Wolberg G Ed—Wolberg G, "Image Resampling", Jan. 1, 1992, Digital Image Warping, IEEE Computer Society Press, Los Alamitos, CA, pp. 117-161, XP002678301.

Unser M, "Splines a Perfect Fit for Signal and Image Processing", IEEE Signal Processing Magazine, IEEE Service Center, Piscataway, NJ, US, vol. 16, No. 6, Nov. 1, 1999, pp. 22-38, XP001059038 .

Alshina E et al, "CE3: Experimental results of DCTIF by Samsung", 4. JCT-VC Meeting; 95. MPEG Meeting; Jan. 20, 2011-Jan. 28, 2011; Daegu;(Joint Collaborative Team on Video Coding of ISO/IEC JTC1/SC29/WG11and ITU-T SG.16 ); URL: http://wftp3.itu.int/av-arch/jctvc-site/ , No. JCTVC-D344, Jan. 15, 2011, XP030008383, pp. 1-15.

Alshina E et al, "CE3: DCT derived interpolation filter test by Samsung", 6. JCT-VC Meeting; 97. MPEG Meeting; Jul. 14, 2011-Jul. 22, 2011; Torino; (Joint Collaborative Team on Video Coding of ISO/IEC JTC1/SC29/WG11 and ITU-T SG.16 ); URL: http://wftp3.itu.int/av-arch/jctvc-site/ , No. JCTVC-F247, Jul. 2, 2011, XP030009270, pp. 1-10.

Communication from the European Patent Office issued Feb. 23, 2015, in a counterpart European Application No. 11829611.0.

Fuldseth, A., et al, Transform design for HEVC with 16 bit intermediate data representation, Joint Collaborative Team on Video Coding (JCTVC) of ITU-T SG16 WP3 and ISO/IEC JTC1/SC29/WG11 JCTVC-E243,<URL:http://phenix.it-sudparis.eu/jct/doc_end_user/documents/5_Geneva/wg11/JCTVC-E243-v4.zip>, Mar. 17, 2011, pp. 1-16.

Communication from the Japanese Patent Office dated Dec. 9, 2014, in a counterpart Japanese application No. 2014-518816.

Fuldseth, et al.; "Unified Transform Design for HEVC with 16 Bit Intermediate Data Representation", Joint Collaborative Team on Video Coding (JCT-VC) of ITU-T SG16 WP3 and ISO/IEC JTC1/SC29/WG11, Jan. 2011, 7 pages total.

Communication dated Apr. 21, 2015, issued by the European Patent Office in counterpart European Application No. 12805381.6.

Misra, et al.; "On Transform Dynamic Range", Joint Collaborative Team on Video Coding (JCT-VC) of ITU-T SG16 WP3 and ISO/IEC JTC1/SC29/WG11, Jan. 2011, 5 pages total.

Misra, et al.; "Enforcing the 16-Bit Inverse Transform Dynamic Range", Joint Collaborative Team on Video Coding (JCT-VC) of ITU-T SG16 WP3 and ISO/IEC JTC1/SC29/WG11, Mar. 2011, 4 pages total.

Communication dated Jul. 6, 2015, issued by the European Patent Office in counterpart European Application No. 14192910.9.

Communication dated Jul. 6, 2015, issued by the European Patent Office in counterpart European Application No. 15153226.4.

(56) References Cited

OTHER PUBLICATIONS

Communication dated Jan. 27, 2016 issued by the Korean Patent Office in counterpart Korean Patent Application No. 10-2014-0054391.
Communication dated Mar. 25, 2016 issued by the Korean Patent Office in counterpart Korean Patent Application No. 10-2015-0131058.
Communication dated Feb. 6, 2016 issued by the State Intellectual Property Office of P.R. China in counterpart Chinese Patent Application No. 201510188743.0.
Communication dated Jan. 27, 2016 issued by the State Intellectual Property Office of P.R. China in counterpart Chinese Patent Application No. 201510188115.2.
Communication dated May 26, 2016 from the Russian Patent Office in counterpart application No. 2014102989/08.
Communication dated Apr. 27, 2016, from the Intellectual Property Office of Taiwan in counterpart application No. 104142194.
Communication dated Jun. 3, 2016, from the State Intellectual Property Office of People's Republic of China in counterpart Application No. 201280042084.4.

* cited by examiner

CODING UNIT (1010)

PREDICTION UNIT (1060)

VIDEO ENCODING METHOD WITH BIT DEPTH ADJUSTMENT FOR FIXED-POINT CONVERSION AND APPARATUS THEREFOR, AND VIDEO DECODING METHOD AND APPARATUS THEREFOR

CROSS-REFERENCE TO RELATED APPLICATIONS

This application is a National Stage application under 35 U.S.C. §371 of PCT/KR2012/005244, filed on Jul. 2, 2012, which claims priority from U.S. Provisional Application No. 61/503,017, filed on Jun. 30, 2011, all the disclosures of which are incorporated herein in their entireties by reference.

BACKGROUND

1. Field

Apparatuses and methods consistent with exemplary embodiments relate to encoding and decoding a video by using fixed point transform and/or inverse transform.

2. Description of the Related Art

As hardware for reproducing and storing higher resolution or higher quality video content is being developed and supplied, a need for a video codec for effectively encoding or decoding the higher resolution or higher quality video content is increasing. In a related art video codec, a video is encoded according to a limited encoding method based on a macroblock having a predetermined size.

Image data in a spatial domain is transformed into coefficients in a frequency domain through transformation. For fast transformation, a video codec divides an image into predetermined-sized blocks and performs discrete cosine transform (DCT) on each of the predetermined-sized blocks to encode frequency coefficients in units of the predetermined-sized blocks. Coefficients in the frequency domain have forms that may be more easily compressed than those of image data in the spatial domain. In particular, pixel values of an image in the spatial domain are expressed with predicted errors through inter prediction or intra prediction of the video codec. Thus, when transformation is performed on the predicted errors, a large amount of data may be converted into '0'. The video codec reduces an amount of data by substituting data that is continuously and repeatedly generated with small-sized data.

SUMMARY

Aspects of one or more exemplary embodiments provide a video encoding method of adjusting a range of encoded output data to adjust a bit depth during restoring of encoded samples, and a video decoding method of substantially preventing overflow of output data in sub operations of a decoding process.

According to an aspect of an exemplary embodiment, there is provided a video decoding method including parsing and restoring quantized transformation coefficients in units of blocks of an image from a received bitstream; restoring transformation coefficients by performing inverse quantization on the quantized transformation coefficients; and restoring samples by performing one-dimensional (1D) inverse transformation and inverse scaling on the quantized transformation coefficients, wherein at least one from among the transformation coefficients and the samples has a predetermined bit depth or less.

The restoring of the transformation coefficients may include generating transformation coefficients of a first bit depth or less after inverse quantization is performed without having to clip the transformation coefficients obtained by performing inverse quantization. The first bit depth may be equal to a size of a first storage unit configured to store the transformation coefficients obtained by performing inverse quantization.

The restoring of the samples may include generating samples of a second bit depth or less after the 1D inverse transformation and the inverse scaling are performed without having to clip samples obtained by performing the 1D inverse transformation and the inverse scaling. The second bit depth may be equal to a size of a second storage unit configured to store the samples obtained by performing inverse transformation and the inverse scaling.

The parsing and restoring of the quantized transformation coefficients may include parsing and restoring quantized transformation coefficients having an adjusted maximum range in such a manner that transformation coefficients of a first bit depth or less are generated after inverse quantization is performed and samples of a second bit depth or less are generated after inverse transformation and the inverse scaling are performed.

When inverse scaling is performed by bit-shifting data, which is obtained after the 1D inverse transformation is performed, by a predetermined bit value, the adjusted maximum range of the quantized transformation coefficients may be determined based on a number of shifted bits for the inverse scaling after the 1D inverse transformation is performed.

According to an aspect of another exemplary embodiment, there is provided a video encoding method including generating quantized transformation coefficients by performing transformation and quantization in units of blocks of an image; determining a maximum range of the quantized transformation coefficients in such a manner that at least one from among output data obtained by performing inverse quantization on the quantized transformation coefficients and output data obtained by performing 1D inverse transformation and inverse scaling on transformation coefficients has a predetermined bit depth or less; and adjusting a range of the quantized transformation coefficients to fall within the maximum range.

The determining of the maximum range of the quantized transformation coefficients may include determining the maximum range of the quantized transformation coefficients by using a first bit depth in such a manner that transformation coefficients of the first bit depth or less are generated without having to perform clipping after the inverse quantization is performed, during restoring of samples. The first bit depth may be equal to a size of a first storage unit configured to store the transformation coefficients.

The determining of the maximum range of the quantized transformation coefficients may include determining the maximum range of the quantized transformation coefficients by using a second bit depth in such a manner that samples of the second bit depth or less are generated without having to perform clipping after the 1D inverse transformation and the inverse scaling are performed, during restoring of the samples. The second bit depth may be equal to a size of a second storage unit configured to store the samples.

The determining of the maximum range of the quantized transformation coefficients may include determining the maximum range of the quantized transformation coefficients by using a predetermined bit value in such a manner that samples of the second bit depth or less are generated by bit-shifting data, which is obtained after the 1D inverse transformation is performed, by the number of shifted bits without having to clip the samples obtained after the inverse scaling is performed.

The adjusting of the range of the quantized transformation coefficients may include clipping the range of the quantized transformation coefficients to fall within the maximum range.

According to an aspect of still another exemplary embodiment, there is provided a video decoding apparatus including a receiving unit configured to parse and restore quantized transformation coefficients in units of blocks of an image from a received bitstream; an inverse quantization unit configured to restore transformation coefficients by performing inverse quantization on the quantized transformation coefficients; an inverse transformation unit configured to restore samples by performing one-dimensional (1D) inverse transformation and inverse scaling on the quantized transformation coefficients; and an image restoration unit configured to restore the image by using the samples restored in units of the blocks, wherein at least one from among the transformation coefficients and the samples has a predetermined bit depth or less.

According to an aspect of still another exemplary embodiment, there is provided a video encoding apparatus including a transformation quantization unit configured to generate quantized transformation coefficients by performing transformation and quantization in units of blocks of an image; a maximum range determination unit configured to determine a maximum range of the quantized transformation coefficients in such a manner that at least one from among output data obtained by performing inverse quantization on the quantized transformation coefficients and output data obtained by performing 1D inverse transformation and inverse scaling on transformation coefficients has a predetermined bit depth or less; and an output unit configured to adjust a range of the quantized transformation coefficients to fall within the maximum range and outputting the adjusted the quantized transformation coefficients in a bitstream.

According to an aspect of still another exemplary embodiment, there is provided a computer readable recording medium for executing the above video decoding method by a computer.

According to an aspect of still another exemplary embodiment, there is provided a computer readable recording medium for executing the above video encoding method by a computer.

BRIEF DESCRIPTION OF THE DRAWINGS

The above and other features will become more apparent by describing in detail exemplary embodiments thereof with reference to the attached drawings in which.

DETAILED DESCRIPTION

Figure 1:
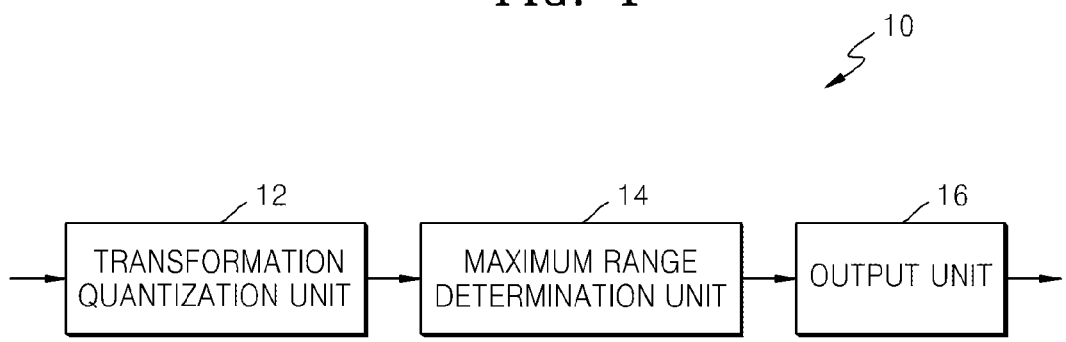
FIG. 1 is a block diagram of a video encoding apparatus according to an exemplary embodiment.

Hereinafter, exemplary embodiments will be described more fully with reference to the accompanying drawings, in which like reference numerals refer to like elements throughout.

Hereinafter, a video encoding method and a video decoding method performed by adjusting fixed-point transformation and inverse transformation, according to exemplary embodiments will be described with reference to FIGS. 1 to 5. A video encoding method and a video decoding method performed based on coding units having a tree structure by adjusting bit depths of fixed-point transformation and inverse transformation, according to exemplary embodiments will be described with reference to FIGS. 6 to 18. Hereinafter, the term 'image' may denote either a still image of a video or a moving picture, i.e., a video.

First, a video encoding method and a video decoding method performed by adjusting bit depths of fixed-point transformation and inverse transformation according to exemplary embodiments will be described with reference to FIGS. 1 to 5.

FIG. 1 is a block diagram of a video encoding apparatus 10 according to an exemplary embodiment.

The video encoding apparatus 10 includes a transformation quantization unit 12, a maximum range determination unit 14, and an output unit 16.

According to an exemplary embodiment, the video encoding apparatus 10 receives video images, splits each of the video images into blocks, and encodes the video images in units of the blocks. The blocks may each have a square shape, a rectangular shape, or any of other geometric shape. That is, the blocks are not limited to predetermined-sized data units. According to an exemplary embodiment, the blocks may include maximum coding units, coding units, prediction units, and transformation units from among coding units having a tree structure. Video encoding and/or decoding performed based on coding units having a tree structure will be described with reference to FIGS. 6 to 18 below.

According to an exemplary embodiment, the video encoding apparatus 10 generates samples by performing intra prediction, inter prediction, transformation, and quantization on each of the blocks, performs entropy coding on the samples, and outputs a result of the entropy coding in a bitstream.

According to an exemplary embodiment, the transformation quantization unit 12 may generate quantized transformation coefficients by performing transformation and quantization on each of the blocks. The transformation quantization unit 12 may generate transformation coefficients by receiving pixel values or differential information between pixel values obtained through image prediction coding and transforming the pixel values or the differential information in units of transformation unit. The transformation quantization unit 12 may generate the quantized transformation coefficients, i.e., quantization coefficients, by quantizing the transformation coefficients. According to an exemplary embodiment, the transformation quantization unit 12 performs fixed-point transformation to generate the transformation coefficients in units of transformation unit.

To restore the samples, inverse quantization may be performed to restore transformation coefficients from the quantized transformation coefficient, and output data that is output as a result of performing inverse quantization may be stored in a storage unit of a predetermined data size.

A data size of a first storage unit for storing the transformation coefficients obtained by performing inverse quantization may be equal to that of a storage unit capable of storing data of a first bit depth. Thus, the output data that is output as the result of performing inverse quantization may be data of the first bit depth or less.

Hereinafter, it is assumed that a maximum absolute value of data may be determined by a bit depth, a data value is a value between a minimum value and a maximum value, and a dynamic range of data may be determined by the bit depth. A data size of a storage unit for storing a predetermined bit depth may also be determined by the bit depth of data. Herein, a 'bit depth of data', a 'maximum absolute value', a 'dynamic range of data', and a 'data size of a storage unit' should be understood as terms having similar meanings.

During restoring of the samples, inverse transformation is performed on the transformation coefficients to restore the original data from the transformation coefficients obtained through fixed-point transformation. Output data obtained through fixed-point inverse transformation to correspond to fixed-point transformation may be inversely scaled to a predetermined bit depth or less. Output data that is output as a result of performing inversely scaling after fixed-point inverse transformation may be stored in a storage unit of a predetermined data size. In other words, a data size of a second storage unit for storing samples obtained by performing inverse transformation and inverse scaling may be equal to the size of a storage unit capable of storing data of a second bit depth. Thus, output data obtained by performing inverse transformation and inverse scaling may be data of the second bit depth or less.

One-dimensional (1D) transformation may be continuously performed twice to perform two-dimensional (2D) transformation on a 2D block. During restoring of the samples, 1D inverse transformation corresponding to transformation performed by the transformation quantization unit 12 may be continuously performed twice to perform 2D inverse transformation. Inverse scaling may be performed whenever 1D inverse transformation is performed.

According to an exemplary embodiment, output data obtained through inverse transformation may be bit-shifted by a predetermined bit value, thereby inverse-scaling the result of performing inverse transformation. Thus, a bit depth of a result of bit-shifting the output data for inverse scaling may be the second bit depth or less.

If the bit depth of the output data obtained by sequentially performing inverse transformation and inverse scaling is limited to the second bit depth, then transformation coefficients that are input values into inverse transformation may also be limited to be less than or equal to a value of a predetermined range, based on the second bit depth.

Quantized transformation coefficients that are input values into inverse quantization may also be limited to be less than or equal to a value of another range to limit transformation coefficients obtained through inverse quantization to be less than or equal to input values into inverse transformation.

Thus, according to an exemplary embodiment, the video encoding apparatus 10 may adjust a dynamic range of quantize transformation coefficient to be output in a bitstream, in consideration of an output range of inverse quantization and an output range of inverse transformation/inverse scaling. Thus, the maximum range determination unit 14 may determine a maximum range of quantized transformation coefficients to be output from the video encoding apparatus 10.

According to an exemplary embodiment, the maximum range determination unit 14 may determine a maximum range of quantized transformation coefficients so that output data obtained by performing inverse quantization on the quantized transformation coefficients and/or output data obtained by performing inverse transformation and inverse scaling on transformation coefficients may be less than or equal to a predetermined bit depth, during restoring of the samples.

According to an exemplary embodiment, the maximum range determination unit 14 may determine a maximum range of transformation coefficients quantized based on the first bit depth so that transformation coefficients of the first bit depth or less may be generated without having to clip transformation coefficients obtained through inverse quantization, during restoring of the samples.

According to an exemplary embodiment, the maximum range determination unit 14 may determine a maximum range of quantized transformation coefficients based on the second bit depth so that samples of the second bit depth or less may be generated without having to clip samples obtained by performing 1D inverse transformation and inverse scaling, during restoring of the samples.

According to an exemplary embodiment, when, during restoring of the samples, data is bit-shifted by a predetermined bit value to perform inverse scaling after 1D inverse transformation, the maximum range determination unit 14 may determine a maximum range of quantized transformation coefficients, based on the number of shifted bits.

According to an exemplary embodiment, the output unit 16 may adjust a range of the quantized transformation coefficients to fall within the maximum range determined by the maximum range determination unit 14 and output a result of the adjustment in a bitstream. The quantized transformation coefficients may be clipped to a value that falls within the maximum range determined by the maximum range determination unit 14.

As described above, the maximum range determination unit 14 may determine a maximum range of quantized transformation coefficients in such a manner that during restoring of the samples inverse quantization, clipping may be skipped both after inverse quantization is performed and after inverse transformation is performed. As another example, the maximum range determination unit 14 may determine a maximum range of quantized transformation coefficients in such a manner that during restoring of the samples, clipping may be skipped after inverse quantization is performed.

According to an exemplary embodiment, video encoding apparatus 10 may include a central processing unit (CPU) (not shown) that controls overall operations of the transformation quantization unit 12, the maximum range determination unit 14, and the output unit 16. Alternatively, the transformation quantization unit 12, the maximum range determination unit 14, and the output unit 16 may be operated by different processors (not shown) therein, and the different processors may operate mutually to operate overall operations of the video encoding apparatus 10. Alternatively, the transformation quantization unit 12, the maximum range determination unit 14, and the output unit 16 may be operated under control of an external processor (not shown) of the video encoding apparatus 10.

According to an exemplary embodiment, the video encoding apparatus 10 may include at least one data storage unit (not shown) for storing data input to and output from the transformation quantization unit 12, the maximum range determination unit 14, and the output unit 16. The video encoding apparatus 10 may include a memory controller (not shown) that controls data to be input to and output from at least one data storage unit.

According to an exemplary embodiment, to output a result of performing encoding, the video encoding apparatus 10 may perform video encoding including transformation by being operated in association with an internal video encoding processor or an external video encoding processor. According to an exemplary embodiment, the internal video encoding processor of the video encoding apparatus 10 may be embodied as an individual processor, or a video encoding processing module included in the video encoding apparatus 10, a central arithmetic device, or a graphic arithmetic device to perform basic video encoding operations.

Figure 2:
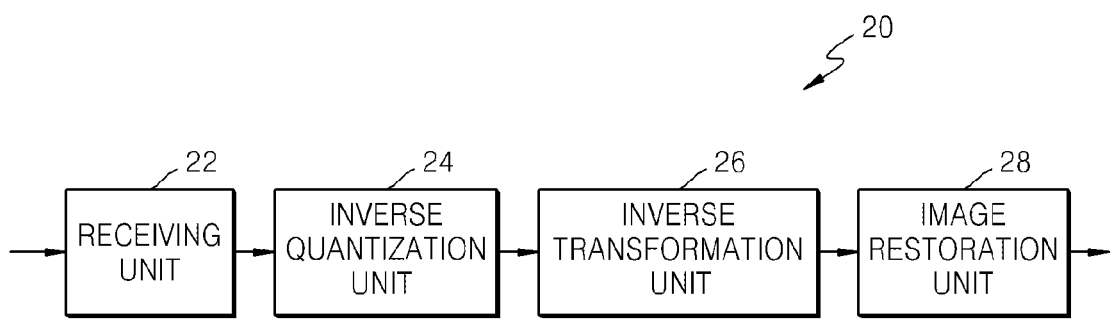
FIG. 2 is a block diagram of a video decoding apparatus according to an exemplary embodiment.

FIG. 2 is a block diagram of a video decoding apparatus 20 according to an exemplary embodiment.

According to an exemplary embodiment, the video decoding apparatus 20 includes a receiving unit 22, an inverse quantization unit 24, an inverse transformation unit 26, and an image restoration unit 28.

According to an exemplary embodiment, the video decoding apparatus 20 may receive bitstream containing encoded data of a video. The video decoding apparatus 20 may parse encoded video samples from the bitstream, and generate restored pixels by performing entropy decoding, inverse quantization, inverse transformation, prediction, and motion estimation in image blocks, thereby obtaining a restored image.

According to an exemplary embodiment, the receiving unit 22 parses and restores quantized transformation coefficients in units of image blocks from the bitstream. Thus, according to an exemplary embodiment, the receiving unit 22 may parse and restore quantized transformation coefficients that fall within a predetermined maximum range from the bitstream. According to an exemplary embodiment, the quantized transformation coefficients parsed from the bitstream are adjusted to fall within the predetermined maximum range and output in a bitstream, during an encoding process.

According to an exemplary embodiment, the inverse quantization unit 24 may restore transformation coefficients of a first bit depth or less by performing inverse quantization on the quantized transformation coefficients. The first bit depth may be equal to a data size of a first storage unit for storing transformation coefficients obtained by performing inverse quantization. According to an exemplary embodiment, the inverse quantization unit 24 may generate the transformation coefficients of the first bit depth or less after inverse quantization is performed, without having to clip the transformation coefficients obtained through inverse quantization.

According to an exemplary embodiment, the inverse transformation unit 26 may restore samples of a second bit depth or less by performing 1D inverse transformation and inverse scaling on transformation coefficients at least once. For example, for 2D inverse transformation, inverse transformation and inverse scaling may be continuously performed twice. The second bit depth may be equal to a data size of a second storage unit for storing samples generated by performing inverse transformation and inverse scaling.

According to an exemplary embodiment, the inverse transformation unit 26 may generate samples of the second bit depth or less by performing 1D inverse transformation and inverse scaling without having to clip samples obtained by performing 1D inverse transformation and inverse scaling.

According to an exemplary embodiment, for inverse scaling, the inverse transformation unit 26 may bit-shift data, which is obtained by performing 1D inverse transformation, to a predetermined bit value. The receiving unit 22 may receive quantized transformation coefficients clipped according to a maximum range determined based on the number of shifted bits.

As described above, quantized transformation coefficient having a limited range may be input to the inverse quantization unit 24 so that the inverse quantization unit 24 may output the transformation coefficients of the first bit depth or less without performing clipping. Similarly, transformation coefficient having a limited range may be input to the inverse transformation unit 26 so that the inverse transformation unit 26 may output the transformation coefficients of the second bit depth or less without performing clipping.

Since the quantized transformation coefficients received by the receiving unit 22 has a limited maximum range, the transformation coefficients of the first bit depth or less may be generated without performing clipping after the inverse quantization unit 24 performs inverse quantization, and the samples of the second bit depth or less may be generated without performing clipping after the inverse transformation unit 26 performs inverse transformation and inverse scaling.

According to an exemplary embodiment, the image restoration unit 28 may restore images from samples restored in units of blocks. For example, images may be restored by performing intra prediction or motion compensation on samples restored in units of blocks.

According to an exemplary embodiment, clipping may be skipped after the inverse quantization unit 24 performs inverse quantization and after the inverse transformation unit 26 performs inverse transformation, according to a maximum range of the received quantized transformation coefficient. As another example, clipping may be skipped only after the inverse quantization unit 24 performs inverse quantization, according to a maximum range of the received quantized transformation coefficient.

According to an exemplary embodiment, the video decoding apparatus 20 may include a central processing unit (CPU) (not shown) that controls overall operations of the receiving unit 22, the inverse quantization unit 24, the inverse transformation unit 26, and the image restoration unit 28. Alternatively, the receiving unit 22, the inverse quantization unit 24, the inverse transformation unit 26, and the image restoration unit 28 may be operated by different processors (not shown) therein, and the different processors may operate mutually to operate overall operations of the video decoding apparatus 20. Alternatively, the receiving unit 22, the inverse quantization unit 24, the inverse transformation unit 26, and the image restoration unit 28 may be operated under control of an external processor (not shown) of the video decoding apparatus 20.

According to an exemplary embodiment, the video decoding apparatus 20 may include at least one data storage unit (not shown) for storing data input to and output from the receiving unit 22, the inverse quantization unit 24, the inverse transformation unit 26, and the image restoration unit 28. The video decoding apparatus 20 may include a memory controller (not shown) that controls data to be input to and output from at least one data storage unit.

According to an exemplary embodiment, to restore video according to a decoding process, the video decoding apparatus 20 may perform video decoding in association with an internal video decoding processor or an external video decoding processor. According to an exemplary embodiment, the internal video decoding processor of the video decoding apparatus 20 may be embodied as an individual processor, or a video decoding processing module included in the video decoding apparatus 20, a central arithmetic device, or a graphic arithmetic device to perform basic video decoding operations.

According to an exemplary embodiment, the video encoding apparatus 10 has previously limited a data range of the quantized transformation coefficients, based on the size of a storage unit, e.g., a temporary buffer, for storing data obtained after inverse quantization and inverse transformation are performed during restoring of samples. Thus, the video decoding apparatus 20 may store output data in the temporary buffer of a fixed bit depth without clipping the output data during performing of inverse quantization and inverse transformation on received quantized transformation coefficients. Thus, it is possible to substantially prevent overflow from occurring when fixed-point transformation is performed during a video decoding process, thereby saving hardware resources for performing clipping.

Figure 3:
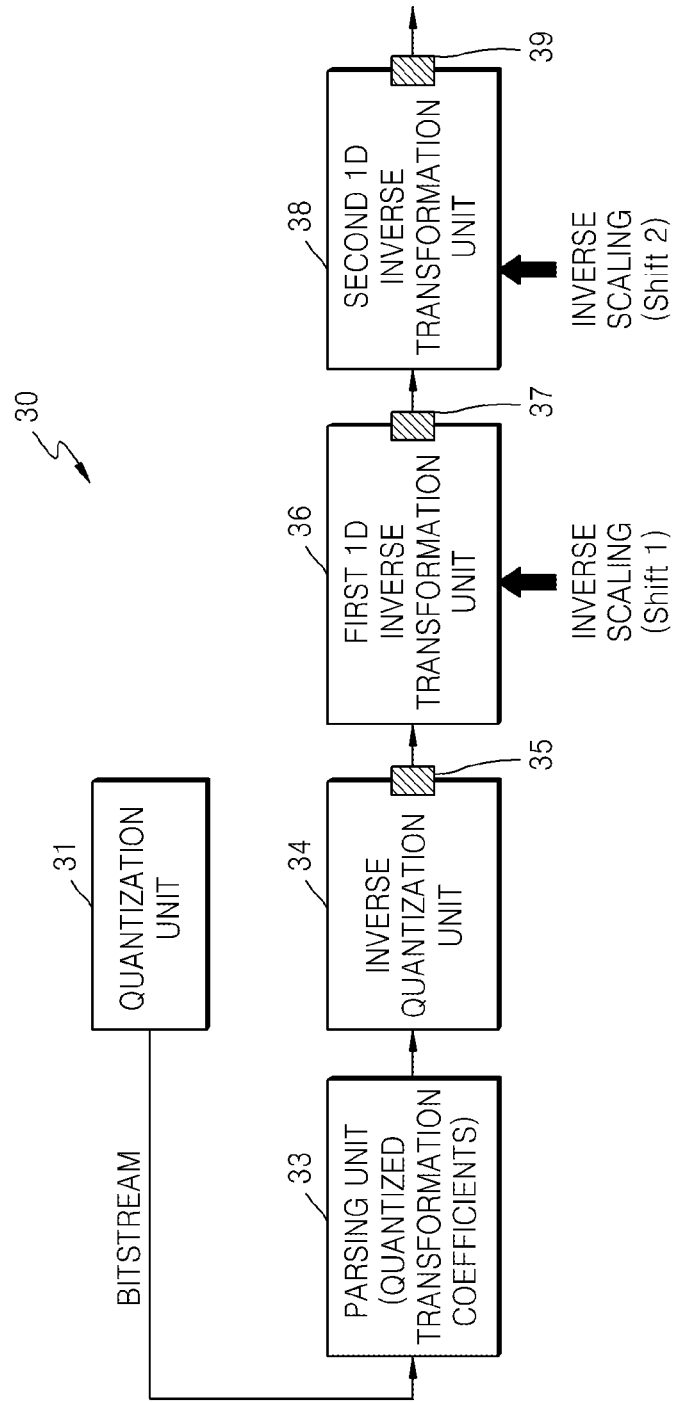
FIG. 3 illustrates a process of changing a bit depth in an encoding/decoding system according to an exemplary embodiment.

FIG. 3 illustrates a process of changing a bit depth in an encoding/decoding system 30, according to an exemplary embodiment.

Referring to FIG. 3, the encoding/decoding system 30 includes a quantization unit 31 for an encoding process, and includes a parsing unit 33, an inverse quantization unit 34, a first 1D inverse transformation unit 36, and a second 1D inverse transformation unit 38 for a decoding process.

The quantization unit 31 may quantize transformation coefficients obtained according to a video encoding process, and output a bitstream including the quantized transformation coefficients. A range of outputting the quantized transformation coefficients may be limited to a predetermined range. To this end, the transformation coefficients may be clipped to fall within the predetermined range.

The parsing unit 33 may parse and restore the quantized transformation coefficients from the bitstream. The inverse quantization unit 34 may restore transformation coefficients by performing inverse quantization on the quantized transformation coefficients. The transformation coefficients may be temporarily stored in a storage unit 35 before they are output from the inverse quantization unit 34. Thus, the size of output data of the inverse quantization unit 34 may be limited to be less than or equal to a first bit depth of the storage unit 35.

The first 1D inverse transformation unit 36 may perform 1D inverse transformation on the transformation coefficients in a first direction. The second 1D inverse transformation unit 38 may perform 1D inverse transformation on a result of performing 1D inverse transformation received from the first 1D inverse transformation unit 36, in a second direction.

The first 1D inverse transformation unit 36 and the second 1D inverse transformation unit 38 may perform fixed-point inverse transformation, and perform inverse scaling on a result of performing inverse transformation.

The first 1D inverse transformation unit 36 may bit-shift data, which is obtained by performing 1D inverse transformation in the first direction, to a first shift bit value shift1 to perform inverse scaling on this data. The second 1D inverse transformation unit 38 may bit-shift data, which is obtained by performing 1D inverse transformation in the second direction, to a second shift bit value shift2 to perform inverse scaling on this data.

The first 1D inverse transformation unit 36 may temporarily store data output therefrom in a storage unit 37. Thus, the size of the output data of the first 1D inverse transformation unit 36 may be limited to be less than or equal to a data size of the storage unit 37.

Similarly, the second 1D inverse transformation unit 38 may temporarily store data output therefrom in a storage unit 39. Thus, the size of the output data of the second 1D inverse transformation unit 38 may be limited to be less than or equal to a data size of the storage unit 39.

For example, a maximum absolute value MaxC of a transformation coefficient C inversely quantized by the inverse quantization unit 34 may be limited according to the following equation:

$$|C|<\text{Max}C=2^{bq}-1,\qquad\text{[Equation 1]}$$

wherein if a bit depth of the data size of the storage unit 35 is bq bit long, the maximum absolute value MaxC of the transformation coefficient C may be $2^{bq}-1$ and the transformation coefficient C may fall within a range of $\{-2^{bq}, \ldots, 2^{bq}-1\}$.

Similar to operations of the first 1D inverse transformation unit 36 and the second 1D inverse transformation unit 38, a maximum absolute value Maxk of data $C_k$ that is inversely transformed by performing $k^{th}$ 1D inverse transformation may be limited according to the following equation:

$$|C_k|<\text{Max}k=2^{bk}-1,\qquad\text{[Equation 2]}$$

wherein if a bit depth of the data size of the storage units 37 and 39 is bk bit long, a maximum absolute value Maxk of the inverse transformed data $C_k$ may be $2^{bk}-1$ and the transformation coefficient C may fall within a range of $\{-2^{bk}, \ldots, 2^{bk}-1\}$.

Thus, a range of output data of each of the inverse quantization unit 34, the first 1D inverse transformation unit 36, and the second 1D inverse transformation unit 38 may be limited according to Equations 1 and 2 to substantially prevent overflow from occurring.

In a related art, clipping is performed so that the sizes of the output data of the inverse quantization unit 34, the first 1D inverse transformation unit 36, and the second 1D inverse transformation unit 38 may be respectively less than or equal to the data sizes of the storage units 35, 37, and 39 according to Equations 1 and 2.

However, according to an exemplary embodiment, the video encoding apparatus 10 and the video decoding apparatus 20 employ a method of adjusting a maximum range of quantized transformation coefficients to minimize a clipping operation performed during a video decoding process.

Size of data input to the first 1D inverse transformation unit 36 or the second 1D inverse transformation unit 38 may be limited to control the output data thereof to be less than or equal to a predetermined bit depth. To this end, the size of output data of the inverse quantization unit 34 may be limited. Also, the sizes of the quantized transformation coefficients input to the inverse quantization unit 34 may be limited to be less than or equal to a predetermined bit depth to limit the size of the output data of the inverse quantization unit 34 to be less than or equal to a predetermined bit depth. Thus, a maximum range of the quantized transformation coefficients output from the quantization unit 31 may be controlled to limit the range of the output data of each of the inverse quantization unit 34, the first 1D inverse transformation unit 36, and the second 1D inverse transformation unit 38 without having to perform clipping.

First, a maximum range of input data required to limit the range of the output data of the first 1D inverse transformation unit 36 or the second 1D inverse transformation unit 38 may be determined based on a transformation matrix, by using the following equation:

$$Y = TR\_MATRIX \times X, \quad \text{[Equation 3]}$$

wherein a vector X denotes input data having a size N for inverse transformation, a vector Y denotes output data having the size N, and TR_MATRIX denotes a transformation matrix having a size of N×N. If a maximum absolute value of elements of the vector X is max_abs_X and a maximum absolute value of elements in an row of the transformation matrix TR_MATRIX is max_abs_TR_MATRIX$_i$, a maximum absolute value of output data $Y_i$ and a maximum absolute value max_abs_Y of elements of the vector Y may be determined according to the following equation:

$$Y_i = \text{max\_abs\_}TR\_MATRIX_i * \text{max\_abs\_}X;$$

$$\text{max\_abs\_}Y = \text{Max}\{\text{max\_abs\_}TR\_MATRIX_i\} * \text{max\_abs\_}X \quad \text{[Equation 4]}$$

wherein Max{max_abs_TR_MATRIX$_i$} refers to an L1-norm of a transformation matrix for $k^{th}$ transformation, i.e., L1_TR_MATRIX_k. A final operation of $k^{th}$ 1D transformation is bit-shifting for inverse scaling. Thus, a total increase in a bit depth during $k^{th}$ 1D transformation may be determined by the following equation:

$$\text{max\_abs\_}Y = (L1\_TR\_MATRIX\_k * \text{max\_abs\_}X + \text{off\_set\_}k) \gg \text{shift\_}k, \quad \text{[Equation 5]}$$

wherein for $k^{th}$ inverse scaling, an offset off_set_k is $2^{\text{shift\_}k-1}$.

As described above, if the size of the output data Y obtained by performing 1D transformation is less than or equal to a bk-bit depth, the range of the output data Y may be expressed as follows:

$$-2^{bk} \leq Y \leq 2^{bk} - 1;$$

$$\text{max\_abs\_}Y \leq 2^{bk} - 1 \quad \text{[Equation 6]}$$

Thus, the following equation may be derived from a combination of Equations 5 and 6:

$$((L1\_TR\_MATRIX\_k * \text{max\_abs\_}X + \text{off\_set\_}k) \gg \text{shift\_}k) \leq 2^{bk} - 1;$$

$$(L1\_TR\_MATRIX\_k * \text{max\_abs\_}X + \text{off\_set\_}k) \leq (2^{bk+\text{shift\_}k} - 2^{\text{shift\_}k});$$

$$\text{max\_abs\_}X \leq 2^{bk+\text{shift\_}k} - 2^{\text{shift\_}k} - 2^{(\text{shift\_}k-1)}) / L1\_TR\_MATRIX\_k \quad \text{[Equation 7]}$$

If a range of input data for inverse transformation is limited according to a last equation expressed in Equation 7, it is possible to substantially prevent overflow from occurring in output data obtained by performing inverse transformation.

Thus, if the bk-bit depth expressed in Equations 6 and 7 is generalized to Max_k, the maximum range of input data for $k^{th}$ inverse transformation may be generated as follows:

$$\text{max\_abs\_}Y \leq \text{Max\_}k;$$

$$\text{max\_abs\_}X \leq (\text{Max\_}k * 2^{\text{shift\_}k} - 2^{(\text{shift\_}k-1)}) / L1\_TR\_MATRIX\_k \quad \text{[Equation 8]}$$

That is, the maximum range of input data for $k^{th}$ inverse transformation may be determined based on storage unit size Max_k, a shift bit value shift_k for inverse scaling, and the L1-norm (L1_TR_MATRIX_k) of the transformation matrix.

Next, the range of input data required to limit the range of output data of the inverse quantization unit 34 may be determined based on inverse quantization variables, according to the following equation 9. According to Equation 9, a quantized transformation coefficient qC may be restored to a transformation coefficient C through inverse quantization.

$$C = (((qC * \text{scale}(QP)) \ll \text{bits}(QP)) + i\text{Add}) \gg i\text{Shift}; \quad \text{[Equation 9]}$$

If the size of the transformation coefficient C is limited to a maximum limit MaxC as expressed in Equation 1, a maximum range of the quantized transformation coefficient qC which is input data for inverse quantization may be determined based on the following equation:

$$-\text{Max}C \leq (((qC * \text{scale}(QP)) \ll \text{bits}(QP)) + i\text{Add}) \gg i\text{Shift} \leq \text{Max}C;$$

$$|qC| \leq ((\text{Max}C \ll i\text{Shift}) - i\text{Add}) \gg \text{bits}(QP) / \text{scale}(QP); \quad \text{[Equation 10]}$$

In other words, the maximum range of the input data for inverse quantization may be determined based on the maximum limit MaxC of the output data and the inverse quantization variables.

Next, while inverse quantization and inverse transformation are sequentially performed, the relationship between a limit of output data and a maximum range of input data in each of operations is as follows:

TABLE 0

| | Operation | |
| --- | --- | --- |
| | restrictive conditions Maximum absolute value of output data | Limited maximum range of input data Maximum absolute value of input data |
| Second 1D inverse transformation | Max_2 | Max $2 * 2^{\text{shift\_}2} - 2^{(\text{shift\_}2-1)}) / L1\_TR\_MATRIX\_2$ |
| First 1D inverse transformation | Max_1 | Max $1 * 2^{\text{shift\_}1} - 2^{(\text{shift\_}1-1)}) / L1\_TR\_MATRIX\_1$ |
| Inverse quantization | MaxC | $((\text{Max}C \ll i\text{Shift}) - i\text{Add}) \gg \text{bits}(QP) / \text{scale}(QP)$ |

Thus, to substantially prevent overflow from occurring in output data obtained when each of inverse quantization and first and second 1D inverse transformation is performed and allow a clipping operation to be skipped, restrictive conditions expressed in Equations 11 and 12 need to be satisfied.

$$\text{Max\_}1 \leq (\text{Max\_}2 * 2^{\text{shift\_}2} - 2^{(\text{shift\_}2-1)}) / L1\_TR\_MATRIX\_2 \quad \text{[Equation 11]}$$

$$\text{Max}C \leq (\text{Max\_}1 * 2^{\text{shift\_}1} - 2^{(\text{shift\_}1-1)}) / L1\_TR\_MATRIX\_1 \quad \text{[Equation 12]}$$

$$|qC| \leq ((\text{Max}C \ll i\text{Shift}) - i\text{Add}) \gg \text{bits}(QP) / \text{scale}(QP)$$

According to Equation 12, to skip clipping of output data obtained by performing first 1D inverse transformation, a maximum absolute value of output data obtained by performing inverse quantization needs be less than or equal to a maximum range of input data for first 1D inverse transformation.

According to Equation 11, to skip clipping of output data obtained by performing second 1D inverse transformation, a maximum absolute value of output data obtained by performing first 1D inverse quantization needs be less than or equal to a maximum range of input data for second 1D inverse transformation.

According to Equation 13, to skip clipping of output data obtained by performing inverse quantization, a maximum absolute value of quantized transformation coefficients restored from a bitstream needs be less than or equal to a maximum range of input data for inverse quantization.

According to an exemplary embodiment, the video encoding apparatus 10 and the video decoding apparatus 20 may skip at least one from among clipping operations performed after inverse quantization and inverse transformation are performed during a decoding process.

For example, if the maximum range of the quantized transformation coefficient satisfies only Equation 13 and inversely quantized data and first inversely transformed data do not respectively satisfy Equations 11 and 12, then clipping may be skipped only after inverse quantization is performed. In other words, to skip clipping after inverse quantization is performed, the video encoding apparatus 10 may limit a maximum range of quantized transformation coefficients according to Equation 13, not in consideration of Equations 11 and 12.

As another example, if quantized transformation coefficients output from the video encoding apparatus 10 to the video decoding apparatus 20 satisfy Equation 13 and inversely quantized data satisfies Equation 12, clipping may be skipped after inverse quantization is performed and after first 1D inverse transformation is performed.

When the video decoding apparatus 20 according to an exemplary embodiment stores output data obtained after inverse quantization and 1D inverse transformation are performed in a 16-bit buffer, conditions of quantized transformation coefficients that allow clipping to be skipped after inverse quantization and 1D inverse transformation are performed will now be described.

Samples having values $-2^{15}, \ldots, 2^{15}-1$ may be stored in the 16-bit buffer. If an absolute value of output data obtained by performing each of operations, e.g., inverse quantization and inverse transformation, is less than $2^{15}-1$, i.e., 32767, then any storage unit other than the 16-bit buffer is not needed to store data and clipping does not need to be performed after inverse quantization and inverse transformation are performed. Thus, in the video encoding apparatus 10 and the video decoding apparatus 20 according to an exemplary embodiment, a range of input data for each of inverse quantization and inverse transformation is limited to limit an absolute value of output data obtained by performing each of inverse quantization and inverse transformation to $2^{15}-1$.

For example, it is assumed that input data and output data are each p-bit data. A residual value of output data obtained by performing inverse transformation may fall within a range of $\{-2^p+1, \ldots, 2^p-1\}$. Thus, a maximum absolute value Max_2 of output data obtained by performing second 1D inverse transformation may be $2^p-1$.

In general, a maximum value of a bit depth of a sample value of a video code is '14' and samples of 14 bits or less are thus used. A bit depth of a video codec subject to the HEVC standards is 8 or 10 bits. Thus, output data obtained by performing second 1D inverse transformation falls within a data range of the 16-bit buffer and additional clipping does not need to be performed.

To store output data obtained by performing first 1D inverse transformation in the 16-bit buffer, a range of inversely quantized transformation coefficients which are input data for first 1D inverse transformation needs to satisfy Equation 12.

Also, to store output data obtained by performing inverse quantization in the 16-bit buffer, a range of quantized transformation coefficients which are input data for inverse quantization needs to satisfy Equation 13.

For example, the video encoding apparatus 10 and the video decoding apparatus 20 may use inverse quantization variables expressed in Equation 14 as follows:

$$iShift = p - 9 + \log_2 S;$$

$$bits(QP) = iQP/6 + p - 8 \qquad \text{[Equation 14]}$$

wherein S denotes a block size, and QP and iQP denote a quantization parameter and an inverse quantization parameter, respectively.

Also, scale(QP) may have different six values according to QP %6. For example, if QP %6 has a value of 0, 1, 2, 3, 4, or 5, scale(QP) may have a value of 40, 45, 51, 57, 64, or 72.

When inverse quantization variables expressed in Equation 14 are used, Equation 13 may be changed to Equation 15.

$$|qC| \leq \text{Max}C * 2^{\wedge}(\log_2 S - 1 - iQP/6)/\text{scale}(QP) \qquad \text{[Equation 15]}$$

Thus, if quantized transformation coefficients output from the video encoding apparatus 10 satisfies a maximum range according to Equation 15 and the video decoding apparatus 20 performs inverse quantization by restoring quantized transformation coefficients satisfying maximum range according to Equation 15 from a bitstream, clipping may be skipped after inverse quantization is performed. According to Equation 15, a maximum range of quantized transformation coefficients to be output from the video encoding apparatus 10 may be determined by a buffer size MaxC for storing output data obtained by performing inverse quantization, the block size S, and the quantization parameters QP and iQP.

The following Equation 16 is generated from a combination of Equations 15 and 12.

$$|qC| \leq (\text{Max\_1} * 2^{shift\_1} - 2^{(shift\_1-1)}) * 2^{\wedge}(\log_2 S - 1 - iQP/6)/(L1\_TR\_MATRIX\_1 * \text{scale}(QP)) \qquad \text{[Equation 16]}$$

Thus, if the video encoding apparatus 10 outputs quantized transformation coefficients satisfying a maximum range according to Equation 16 and the video decoding apparatus 20 performs inverse quantization and inverse transformation by restoring the quantized transformation coefficients satisfying the maximum range according to Equation 16 from a bitstream, clipping may be skipped after inverse quantization is performed and after first 1D inverse transformation is performed. According to Equation 16, a maximum range of quantized transformation coefficients to be output from the video encoding apparatus 10 may be determined by a buffer size Max_1 for storing output data obtained by performing first 1D inverse transformation, the block size S, and the quantization parameters QP and iQP.

When the video encoding apparatus 10 and the video decoding apparatus 20 according to an exemplary embodiment use a first transformation/inverse transformation table, a maximum absolute value MAXqC of a quantized transformation coefficient may be determined as shown in Table A. Table A shows the maximum absolute value MAXqC of the quantized transformation coefficient with respect to cases where the quantization parameter QP is '0' and where the quantization parameter QP is '51', respectively.

TABLE A

| Inv. Tr. | L1 | Shift1 | Max1 | MaxC | MAXqC (QP = 0) | MAXqC (QP = 51) |
|---|---|---|---|---|---|---|
| DST4 | 242 | 7 | $2^{15}-1$ | 17331 | 866 | 2 |
| DCT4 | 247 | 7 | $2^{15}-1$ | 16980 | 849 | 2 |
| DCT8 | 479 | 7 | $2^{15}-1$ | 8755 | 875 | 2 |

TABLE A-continued

| Inv. Tr. | L1 | Shift1 | Max1 | MaxC | MAXqC (QP = 0) | MAXqC (QP = 51) |
|---|---|---|---|---|---|---|
| DCT16 | 940 | 7 | $2^{15}$-1 | 4461 | 892 | 2 |
| DCT32 | 1862 | 7 | $2^{15}$-1 | 2252 | 900 | 2 |

As another example, when the video encoding apparatus 10 and the video decoding apparatus 20 use a second transformation/inverse transformation table, a maximum absolute value MAXqC of a quantized transformation coefficient may be determined as shown in Table B.

TABLE B

| Inv. Tr. | L1 | Shift1 | Max1 | MaxC | MAXqC (QP = 0) | MAXqC (QP = 51) |
|---|---|---|---|---|---|---|
| DST4 | 15488 | 13 | $2^{15}$-1 | 17331 | 866 | 2 |
| DCT4 | 15808 | 13 | $2^{15}$-1 | 16980 | 849 | 2 |
| DCT8 | 30622 | 13 | $2^{15}$-1 | 8765 | 875 | 2 |
| DCT16 | 60326 | 13 | $2^{15}$-1 | 4449 | 892 | 2 |
| DCT32 | 119262 | 13 | $2^{15}$-1 | 2250 | 900 | 2 |

In Tables A and B, 'Inv.Tr.' denotes transformation matrix types for transformation/inverse transformation. A number denoting each of the transformation matrix types represents the width of a square transformation block. 'L1' denotes a L1 norm of a transformation matrix according to each of the transformation matrix types. 'Shift1' denotes a shift bit value for inverse scaling after inverse transformation is performed. The shift bit value Shift1 is a fixed value. A maximum absolute value Max1 of data obtained by performing first 1D inverse transformation is also a fixed value since it is determined by a bit depth of a sample.

That is, according to Tables A and B, the L1 norm of the transformation matrix varies according to each of the transformation matrices. A change in the L1 norm of the transformation matrix may result in a change in a maximum absolute value MaxC of each of inversely quantized transformation coefficients. Such a result corresponds to the requirement expressed in Equation 12. Thus, if the quantization parameter QP is '0', a maximum absolute value MAXqC of each of quantized transformation coefficients varies according to the maximum absolute value MaxC of each of the inversely quantized transformation coefficients. Such a result corresponds to the requirement expressed in Equation 15.

However, in some cases, e.g., when the quantization parameter QP is '51', the quantized transformation coefficients may be determined to be constant values irrespective of the maximum absolute value MaxC of the inversely quantized transformation coefficients.

Equations 12 and 16 may be simplified by approximating the L1 norm of the transformation matrix to a square of 2. For example, a first transformation/inverse transformation system may approximate the L1 norm of the transformation matrix to $2^{(\log_2 S+6)}$ according to Table A, and may approximate the L1 norm of the transformation matrix to $2^{(\log_2 S+12)}$ according to Table B.

For example, if the L1 norm of the transformation matrix is approximated to $2^{(\log_2 S+6)}$, then Equations 12 and 16 may be simplified as follows:

$$|MaxC| \leq Max\_1 * 2^{(shift\_1 - \log_2 S - 6)};$$

$$|qC| \leq Max\_1 * 2^{(shift\_1 - 7 - iQP/6)}/scale(QP);$$

$$MaxqC = Max\_1 * 2^{(shift\_1 - 7 - iQP/6)}/scale(QP) \quad [\text{Equation 17}]$$

As described above, according to the simplified requirement of maximum range of the quantized transformation coefficients, the maximum absolute value MaxqC of the quantized transformation coefficients output from the video encoding apparatus 10 to the video decoding apparatus 20 may be determined by a buffer size Max_1 for storing output data obtained by performing first 1D inverse transformation and the quantization parameters QP and iQP. A maximum range of the quantized transformation coefficients may be determined according to the maximum absolute value MaxqC of the quantized transformation coefficients.

The shift bit value Shift1 for inverse scaling after first 1D inverse transformation is performed may be fixed to be a constant in the encoding/decoding system 30. If the shift bit value Shift1 is a variable, the video encoding apparatus 10 may encode and transmit the shift bit value Shift1 and the video decoding apparatus 20 may receive and decode the shift bit value Shift1.

Thus, according to an exemplary embodiment the video encoding apparatus 10 may limit a data range of quantized transformation coefficients, based on the size of a storage unit, e.g., a temporary buffer, which stores data obtained after inverse quantization and inverse transformation are performed during restoring of samples. The video decoding apparatus 20 may receive quantized transformation coefficients of a limited maximum range, and store data in a buffer while clipping may be skipped during performing of inverse quantization and inverse transformation on the quantized transformation coefficients.

Figure 4:
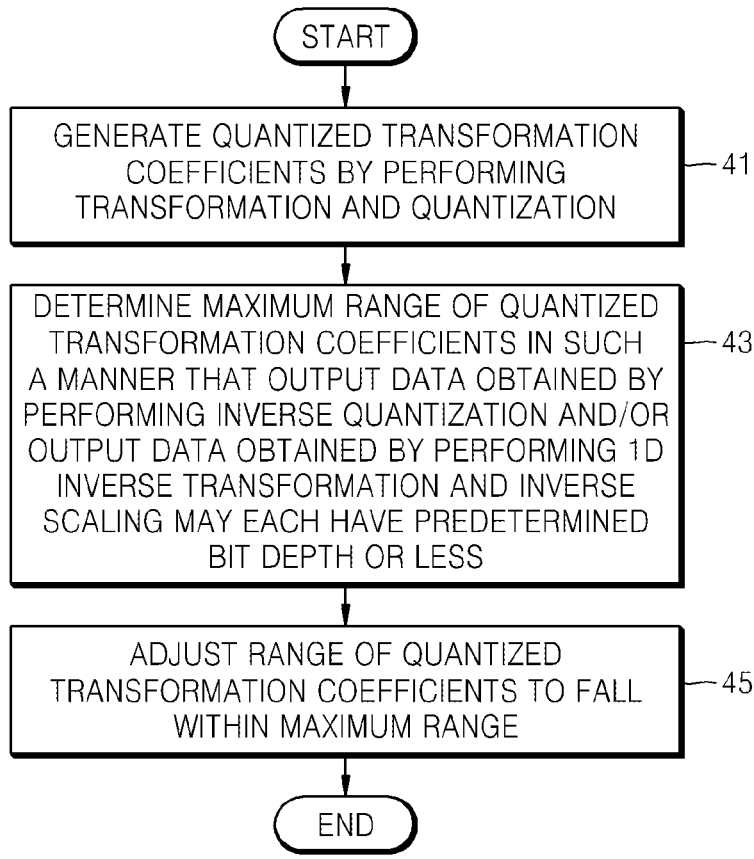
FIG. 4 is a flowchart illustrating a video encoding method according to an exemplary embodiment.

FIG. 4 is a flowchart illustrating a video encoding method according to an exemplary embodiment.

In operation 41, quantized transformation coefficients are generated by performing transformation and quantization on each of blocks of an image.

In operation 42, a maximum range of the quantized transformation coefficients is determined in such a manner that output data obtained by performing inverse quantization on the quantized transformation coefficients and/or output data obtained by performing 1D inverse transformation and inverse scaling on transformation coefficients may each have a predetermined bit depth or less.

In operation 43, a range of the quantized transformation coefficients is adjusted to fall within the maximum range determined in operation 42. In this case, the quantized transformation coefficients may be clipped to fall within the maximum range.

According to an exemplary embodiment, the maximum range of the quantized transformation coefficients may be limited based on a first bit depth during generating of samples, so that transformation coefficients of the first bit depth or less may be generated after inverse quantization is performed without having to perform clipping, during restoring of the samples. In this case, the first bit depth may be equal to a data size of a first storage unit for storing the transformation coefficients during the restoring of the samples.

According to an exemplary embodiment, the maximum range of the quantized transformation coefficients may be limited based on a second bit depth during generating of samples, so that transformation coefficients of the second bit depth or less may be generated after 1D inverse transformation and inverse scaling are performed without having to perform clipping, during restoring of the samples. In this case, the second bit depth may be equal to a data size of a second storage unit for storing the samples during the restoring of the samples.

If inverse scaling is performed by bit-shifting data generated after 1D inverse transformation is performed to a predetermined bit value, the maximum range of the quantized transformation coefficients may be determined based on the number of shifted bits so that the samples of the second bit depth or less may be generated without clipping samples generated after inverse scaling next to inverse transformation is performed.

Figure 5:
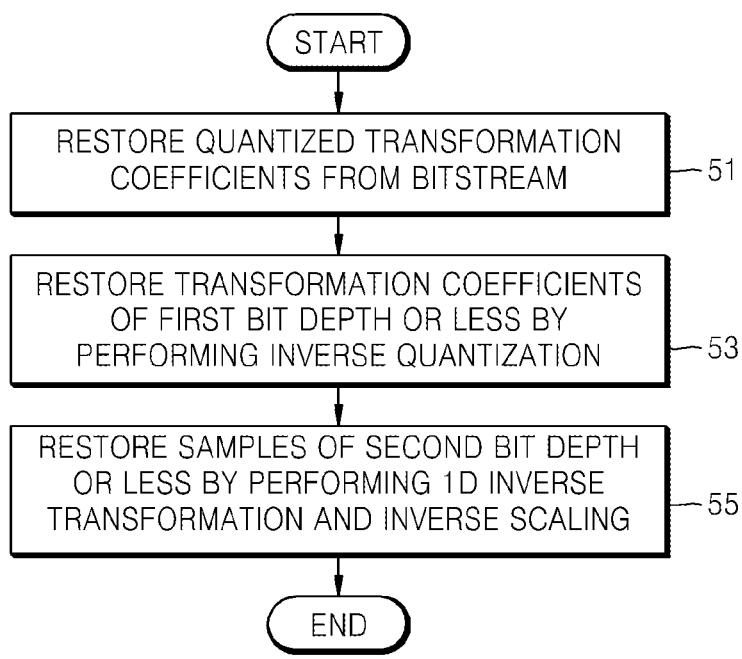
FIG. 5 is a flowchart illustrating a video decoding method according to an exemplary embodiment.

FIG. 5 is a flowchart illustrating a video decoding method according to an exemplary embodiment.

In operation 51, quantized transformation coefficients may be restored by parsing blocks of a received bitstream. A maximum range of the quantized transformation coefficients may be adjusted in an encoding process so that inversely quantized transformation coefficients of a bit depth of a first storage unit or less may be output by performing inverse quantization and samples of a bit depth of a second storage unit or less may be output by performing inverse transformation and inverse scaling.

In operation 53, transformation coefficients of a first bit depth or less may be restored by performing inverse quantization on the quantized transformation coefficients. Transformation coefficients of the bit depth equal to or less than that of the first storage unit which stores the transformation coefficients may be generated by performing inverse quantization on the quantized transformation coefficients without having to perform clipping on the transformation coefficients.

In operation 55, samples of a second bit depth or less may be restored by performing 1D inverse transformation and inverse scaling on the transformation coefficients. Samples of the bit depth of the second storage unit, which stores the samples, may be generated by performing 1D inverse transformation and inverse scaling on the transformation coefficients without having to perform clipping on the samples.

When data generated after 1D inverse transformation is performed is bit-shifted by a predetermined bit value and is inversely scaled, a maximum range of the quantized transformation coefficients may be determined based on a shift bit value for inverse scaling after 1D inverse transformation is performed.

In the video encoding apparatus 10 and the video decoding apparatus 20 according to exemplary embodiments, blocks divided from video data may be split into coding units having a tree structure as described above. A video encoding method and a video encoding apparatus and a video decoding method and a video decoding apparatus based on coding units having a tree structure and transformation units according to an exemplary embodiment will now be described with reference to FIGS. 6 to 18 below.

Figure 6:
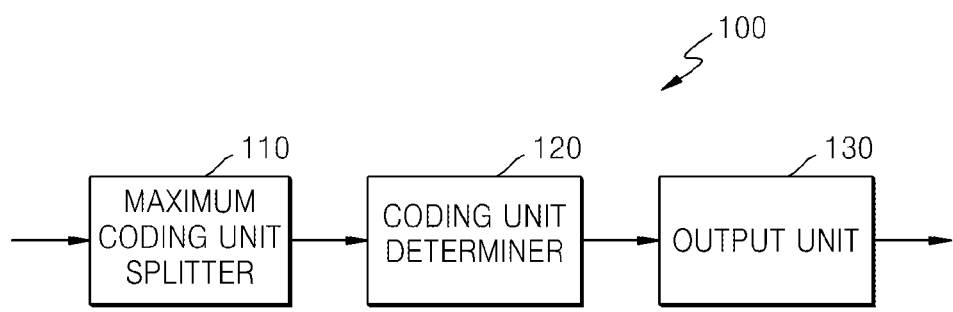
FIG. 6 is a block diagram of a video encoding apparatus based on coding units having a tree structure according to another exemplary embodiment.

FIG. 6 is a block diagram of a video encoding apparatus 100 based on coding units having a tree structure, according to another exemplary embodiment.

According to an exemplary embodiment, the video encoding apparatus 100 using video prediction based on coding units having a tree structure includes a maximum coding unit splitter 110, a coding unit determiner 120, and an output unit 130.

The maximum coding unit splitter 110 may split a current picture based on a maximum coding unit for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and length in squares of 2. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth increase, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit increases, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit may be hierarchically split, may be predetermined.

The coding unit determiner 120 encodes at least one split region obtained by splitting a region of the maximum coding unit according to depths, and determines a depth to output finally encoded image data according to the at least one split region. In other words, the coding unit determiner 120 determines a coded depth by encoding the image data in the deeper coding units according to depths, according to the maximum coding unit of the current picture, and selecting a depth having a least encoding error. The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to the same depth of one maximum coding unit, each of the coding units corresponding to the same depth may be split to a lower depth by measuring an encoding error of the image data of the each coding unit, separately. Accordingly, even when image data is included in one maximum coding unit, the image data is split to regions according to the depths, the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splitting from a maximum coding unit to a minimum coding unit. A first maximum depth according to an exemplary embodiment may denote the total number of splitting from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit. Transformation may be performed according to method of orthogonal transformation or integer transformation.

Since the number of deeper coding units increases whenever the maximum coding unit is split according to depths, encoding including the prediction encoding and the transformation is performed on all of the deeper coding units generated as the depth increases. For convenience of description, the prediction encoding and the transformation will now be described based on a coding unit of a current depth, in a maximum coding unit.

The video encoding apparatus 100 may variously select a size or shape of a data unit for encoding the image data. To encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit to perform the prediction encoding on the image data in the coding unit.

To perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a data unit obtained by splitting at least one of a height and a width of the prediction unit. A partition is a data unit obtained by splitting a prediction unit of a coding unit, and the prediction unit may be a partition, the size of which is equal to that of the coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or a width of the prediction unit, partitions obtained by asymmetrically splitting the height or the width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. Encoding may be independently performed on one prediction unit in a coding unit, thereby selecting a prediction mode having a least encoding error.

The video encoding apparatus 100 may also perform transformation on the image data in a coding unit based not only on the coding unit for encoding the image data, but also based on a data unit that is different from the coding unit. To perform transformation on the coding unit, transformation may be performed on a basis of a transformation unit, the size of which is less than or equal to that of the coding unit. Examples of a transformation unit may include a data unit for an intra mode ad a transformation unit for an inter mode.

Similarly to coding units having a tree structure, the transformation unit in the coding unit may be recursively split into smaller sized regions, so that the transformation unit may be determined independently in units of regions. Thus, residual data in the coding unit may be divided according to the transformation having the tree structure according to transformation depths.

A transformation depth indicating a number of splitting to reach the transformation unit by splitting the height and the width of the coding unit may also set in the transformation unit. For example, in a current coding unit of 2N×2N, a transformation depth may be '0' when a size of a transformation unit is 2N×2N, may be '1' when the size of the transformation unit is N×N, and may be '2' when the size of the transformation unit is N/2×N/2. In other words, transformation units having a tree structure may be set according to transformation depths.

Encoding information according to coded depths requires not only information about the coded depths but also information about prediction and information about transformation. Accordingly, the coding unit determiner 120 may not only determine a coded depth having a least encoding error, but also determine a partition type in a prediction unit, a prediction mode according to prediction units, and a size of a transformation unit for transformation.

A method of determining coding units having a tree structure of a maximum coding unit, prediction units/partitions, and transformation units according to exemplary embodiments, will be described in detail with reference to FIGS. 7 to 18 below.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to a coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Also, the minimum unit may be a maximum rectangular data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set (SPS), or a picture parameter set.

Also, information about a maximum size and a minimum size of a transformation unit available for a current video may also be output via a header of a bitstream, an SPS, a picture parameter set, or the like. The output unit 130 may encode and output reference information, prediction information, unidirectional prediction information, and information about slice types including a fourth slice type which are related to prediction as described above with reference to FIGS. 1 to 6.

In the video encoding apparatus 100, the deeper coding unit may be a coding unit obtained by dividing a height or width of a coding unit of an upper depth by two. In other words, when the size of the coding unit of the current depth is 2N×2N, the size of the coding unit of the lower depth is N×N. Also, the coding unit of the current depth having the size of 2N×2N may include maximum 4 of the coding unit of the lower depth.

Accordingly, the video encoding apparatus 10 may form the coding units having the tree structure by determining coding units having an appropriate (e.g., optimum) shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having higher resolution or larger data amount is encoded in a related art macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit in consideration of a size of the image.

The video encoding apparatus 100 of FIG. 6 may perform the operations of the video encoding apparatus 10 described above with reference to FIG. 1.

The coding unit determiner 120 may perform the operation of the transformation quantization unit 12 of the video encoding apparatus 10. The coding unit determiner 120 generates quantized transformation coefficients by performing transformation and quantization in units of transformation blocks. The output unit 130 may perform the operations of the maximum range determination unit 14 and the output unit 16 of the video encoding apparatus 10.

The output unit 130 determines a maximum range of the quantized transformation coefficients in such a manner that output data obtained by performing inverse quantization on the quantized transformation coefficients and/or output data obtained by 1D inverse transformation and inverse scaling on transformation coefficients may have a predetermined bit depth or less. The output unit 130 may clip the quantized transformation coefficients within the maximum range and output a result of the clipping in a bitstream.

According to an exemplary embodiment, during generating of samples, a maximum range of the quantized transformation coefficients may be limited in consideration of the size of a first storage unit for storing transformation coefficients or bit depths of the transformation coefficients during restoring of the samples, so that transformation coefficients of a first bit depth or less may be generated by performing inverse quantization without having to perform clipping during restoring of the samples.

According to an exemplary embodiment, a maximum range of the quantized transformation coefficients may be limited using the size of a second storage unit for storing samples or a fixed point transformation matrix during restoring of the samples, so that samples of a second bit depth or less may be generated by performing 1D inverse transformation and inverse scaling without having to perform clipping during the restoring of the samples.

When inverse scaling is performed by bit-shifting data, which is obtained after 1D inverse transformation is performed, by a predetermined bit value, the maximum range of the quantized transformation coefficients may be determined based on the number of shifted bits to generate the samples of the second bit depth or less without having to perform clipping samples obtained by performing inverse scaling on the result of performing inverse transformation.

Figure 7:
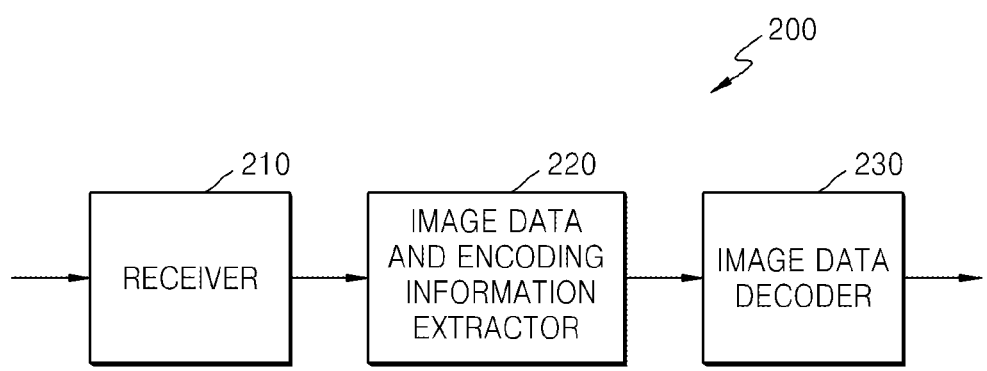
FIG. 7 is a block diagram of a video decoding apparatus based on coding units having a tree structure according to another exemplary embodiment.

FIG. 7 is a block diagram of a video decoding apparatus 200 based on coding units having a tree structure, according to an exemplary embodiment.

The video decoding apparatus 200 using video prediction based on coding units having a tree structure includes a receiver 210, an image data and encoding information extractor 220, and an image data decoder 230.

Definitions of various terms, such as a coding unit, a depth, a prediction unit, a transformation unit, and information about various encoding modes, for various operations of the video decoding apparatus 200 are substantially the same or similar to those described above with respect to the video encoding apparatus 100 of FIG. 6.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header, an SPS, or a picture parameter set related to the current picture or SPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit according to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation.

The image data decoder 230 may perform intra prediction or motion compensation according to a partition and a prediction mode of each coding unit, based on the information about the partition type and the prediction mode of the prediction unit of the coding unit according to coded depths.

Also, to perform inverse transformation in units of maximum coding units, the image data decoder 230 may read information about transformation units having a tree structure in units of coding units and perform inverse transformation in units of the coding units, based on the transformation units. By performing inverse transformation, pixel values of the coding units in a spatial domain may be restored.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to the each coded depth in the current maximum coding unit by using the information about the partition type of the prediction unit, the prediction mode, and the size of the transformation unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. A current coding unit may be decoded by obtaining information about an encoding mode for each of the coding units determined as described above.

The video decoding apparatus 200 of FIG. 7 may perform the operations of the video decoding apparatus 20 of FIG. 2.

The receiver 210 and the image data and encoding information extractor 220 may perform the operation of the receiving unit 22 of the video decoding apparatus 20. The image data decoder 230 may perform the operations of the inverse quantization unit 24, the inverse transformation unit 26, and the image restoration unit 28 of the video decoding apparatus 20.

The image data and encoding information extractor 220 may restore quantized transformation coefficients by parsing transformation blocks of a received bitstream. The restored quantized transformation coefficient may be a result of performing clipping within a predetermined range at an encoding side. A maximum range of the quantized transformation coefficients may be determined at the encoding side in such a manner that data of a bit depth of a first storage unit or less may be output without having to perform clipping after inverse quantization is performed and data of a bit depth of a second storage unit or less may be output without having to perform clipping after inverse transformation and inverse scaling are performed. When data obtained after 1D inverse transformation is performed is bit-shifted by a predetermined bit value and is then is inversely scaled, the maximum range of the quantized transformation coefficients may be determined based on a shift bit value for inverse scaling after 1D inverse transformation is performed.

Thus, the image data decoder 230 may restore transformation coefficients by performing inverse quantization on the quantized transformation coefficients, and may generate transformation coefficients of the bit depth of the first storage unit or less without having to clip transformation coefficients.

Also, the image data decoder 230 may restore samples by performing 1D inverse transformation and inverse scaling on the transformation coefficients, and generate transformation coefficients having the bit depth of the second storage unit or less without having to clip the restored samples.

Thus, the video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded.

Accordingly, even if image data has higher resolution and a larger amount of data, the image data may be efficiently decoded and restored by using a size of a coding unit and an encoding mode, which are adaptively determined according to characteristics of the image data, by using information about an optimum encoding mode received from an encoder.

Figure 8:
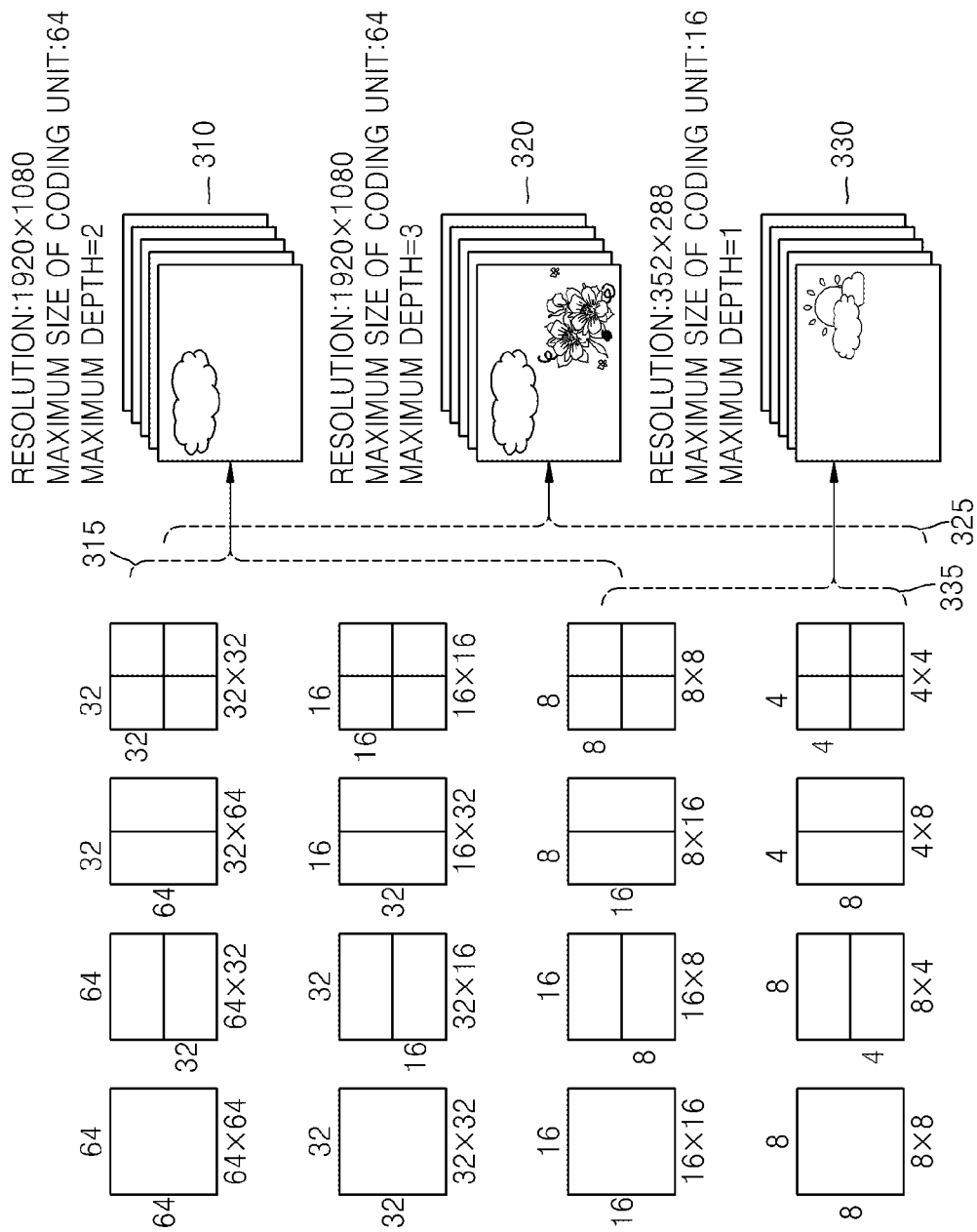
FIG. 8 is a diagram for describing a concept of coding units according to an exemplary embodiment.

FIG. 8 is a diagram for describing a concept of coding units according to an exemplary embodiment.

A size of a coding unit may be expressed in width x height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 8 denotes a total number of splits from a maximum coding unit to a minimum decoding unit.

If a resolution is high or a data amount is larger, a maximum size of a coding unit may be larger to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are increased by two layers by splitting the maximum coding unit twice. Since the maximum depth of the video data 330 is 1, coding units 335 of the video data 330 may include a maximum coding unit having a long axis size of 16, and coding units having a long axis size of 8 since depths are increased by one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are increased by 3 layers by splitting the maximum coding unit three times. As a depth increases, detailed information may be expressed more precisely.

Figure 9:
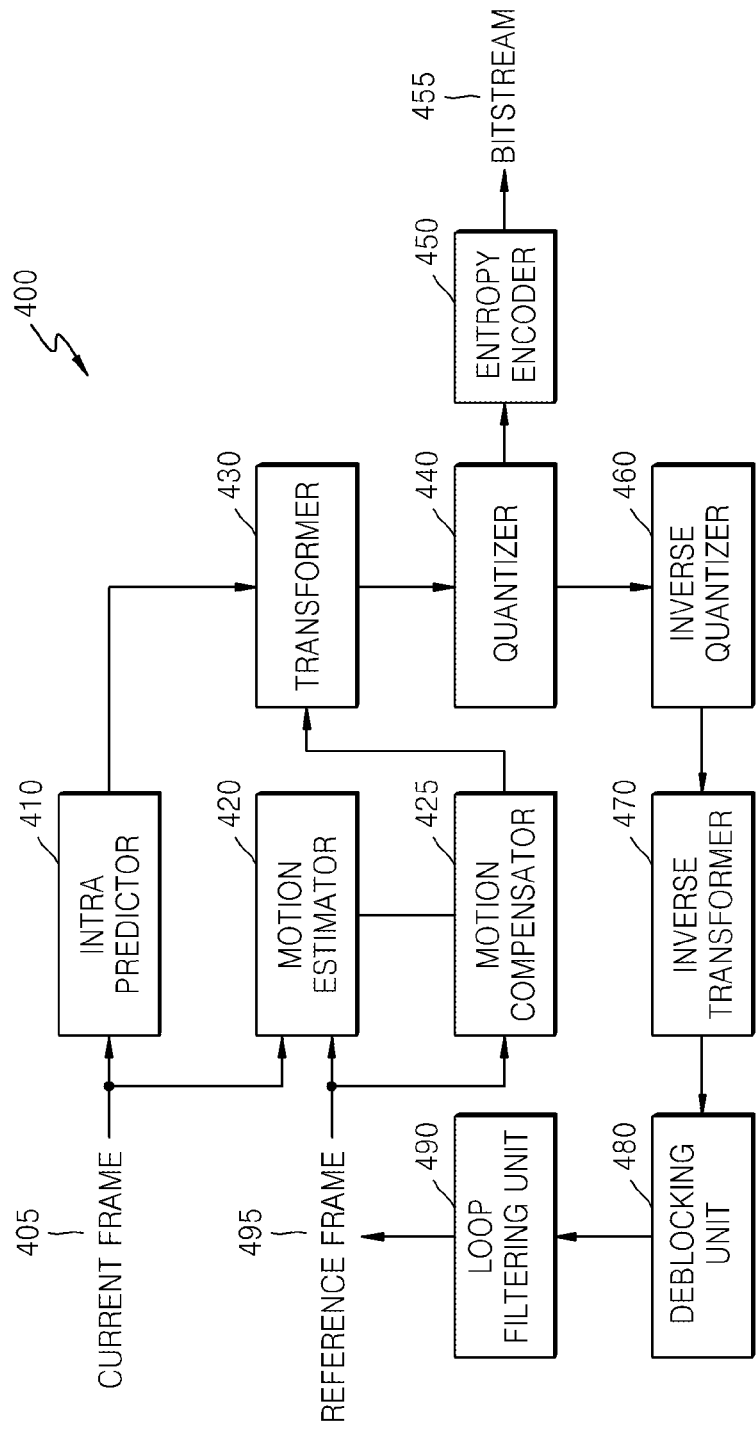
FIG. 9 is a block diagram of an image encoder based on coding units according to an exemplary embodiment.

FIG. 9 is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 perform inter estimation and motion compensation on coding units in an inter mode from among the current frame 405 by using the current frame 405 and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

The image encoder 400 may determine quantized transformation coefficients by performing transformation and quantization on transformation units of the current frame 405, clip the quantized transformation coefficients within a maximum range thereof, and transmit a result of the clipping. The maximum range of the quantized transformation coefficients may be determined in consideration of a bit depth or a storage size and a shifted bit number of a bit-shift operation for inverse scaling during restoring of samples, so that data of a predetermined bit depth may be generated without having to clip output data obtained by performing inverse quantization and output data obtained by performing inverse transformation and inverse scaling during the restoring of the samples.

Figure 10:
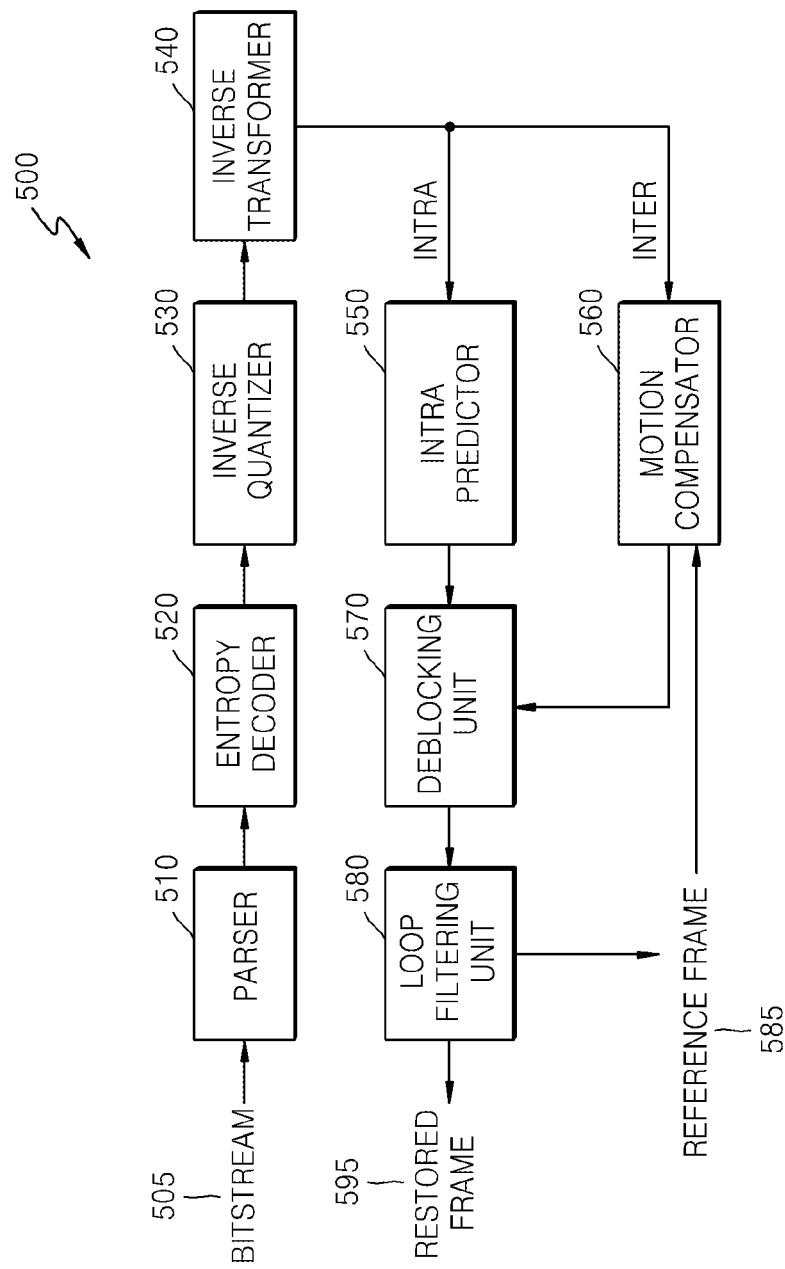
FIG. 10 is a block diagram of an image decoder based on coding units according to an exemplary embodiment.

FIG. 10 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

To decode the image data in the image data decoder 230 of the video decoding apparatus 200, the image decoder 500 may perform operations that are performed after the parser 510.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra prediction 550 and the motion compensator 560 perform operations based on partitions and a prediction mode for each of the coding units having a tree structure, and the inverse transformer 540 perform operations based on a size of a transformation unit for each coding unit.

The image decoder 500 may parse and restore quantized transformation coefficients by performing transformation and quantization on transformation units of a bitstream. Since data of a bit depth of a storage unit is generated by performing inverse quantization on the quantized transformation coefficients, clipping does not need to be performed after inverse quantization is performed. Also, when clipping is skipped after inverse quantization is performed and after inverse scaling is performed, samples of a maximum bit depth or less may be restored.

Figure 11:
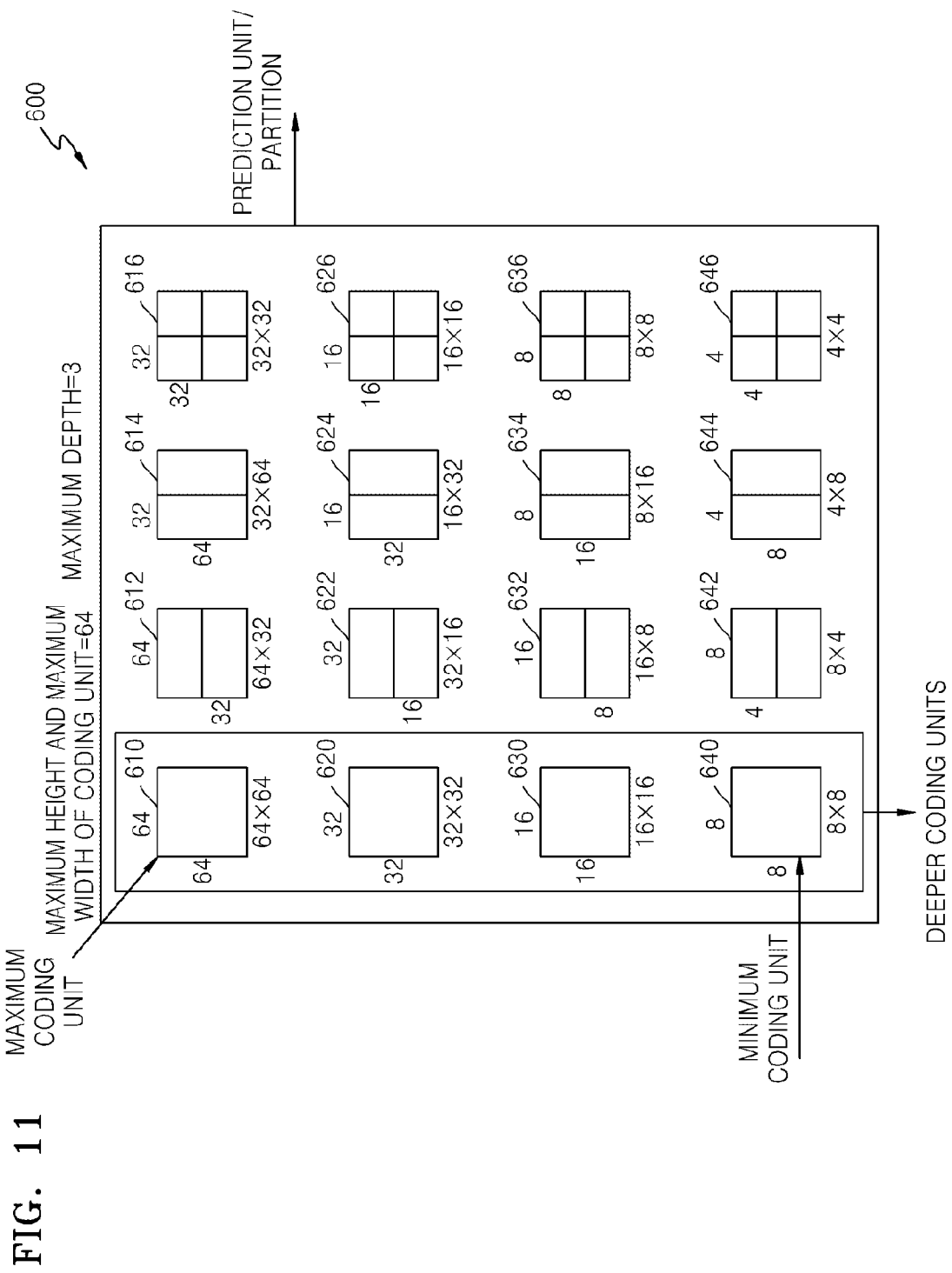
FIG. 11 is a diagram illustrating deeper coding units and partitions according to depths, according to an exemplary embodiment.

FIG. 11 is a diagram illustrating deeper coding units and partitions according to depths, according to an exemplary embodiment.

The video encoding apparatus 100 and the video decoding apparatus 200 use hierarchical coding units to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. In this case, the maximum depth denotes the total number of splitting from a maximum coding unit to a minimum coding unit. Since a depth increases along a vertical axis of the hierarchical structure 600, a height and a width of the deeper coding unit correspond to each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth increases along the vertical axis, and a coding unit 620 having a size of 32×32 and a depth of 1, a coding unit 630 having a size of 16×16 and a depth of 2, and a coding unit 640 having a size of 8×8 and a depth of 3 exist. The coding unit 640 having the size of 8×8 and the depth of 3 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions included in the coding unit 610, i.e., a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e., a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e., a partition 630 having a size of 16×16, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e., a partition 640 having a size of 8×8, partitions 642 having a size of 8×4, partitions 644 having a size of 4×8, and partitions 646 having a size of 4×4.

The coding unit 640 having the size of 8×8 and the depth of 3 is the minimum coding unit and a coding unit of the lowermost depth.

To determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth increases. For example, four coding units corresponding to a depth of 2 are required to cover data that is included in one coding unit corresponding to a depth of 1. Accordingly, to compare encoding results of the same data according to depths, the coding unit corresponding to the depth of 1 and four coding units corresponding to the depth of 2 are each encoded.

To perform encoding for a current depth from among the depth, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth increases along the vertical axis of the hierarchical structure 600. A depth and a partition having the minimum encoding error in the coding unit 610 may be selected as the coded depth and a partition type of the coding unit 610.

Figure 12:
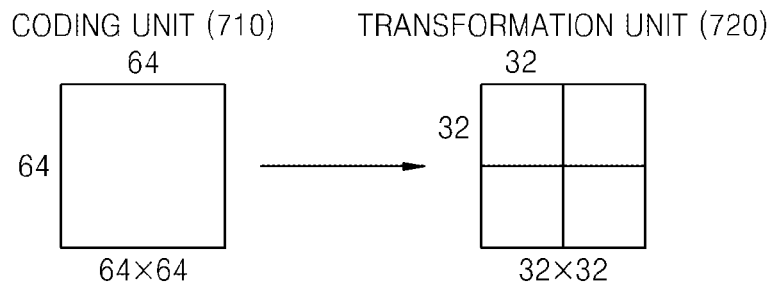
FIG. 12 is a diagram for describing a relationship between a coding unit and transformation units according to an exemplary embodiment.

FIG. 12 is a diagram for describing a relationship between a coding unit 710 and transformation units 720, according to an exemplary embodiment.

The video encoding apparatus 100 or 200 encodes or decodes an image according to coding units having sizes smaller than or equal to a maximum coding unit for each maximum coding unit. Sizes of transformation units for transformation during encoding may be selected based on data units that are not larger than corresponding coding unit.

For example, in the apparatus 100 or 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 13:
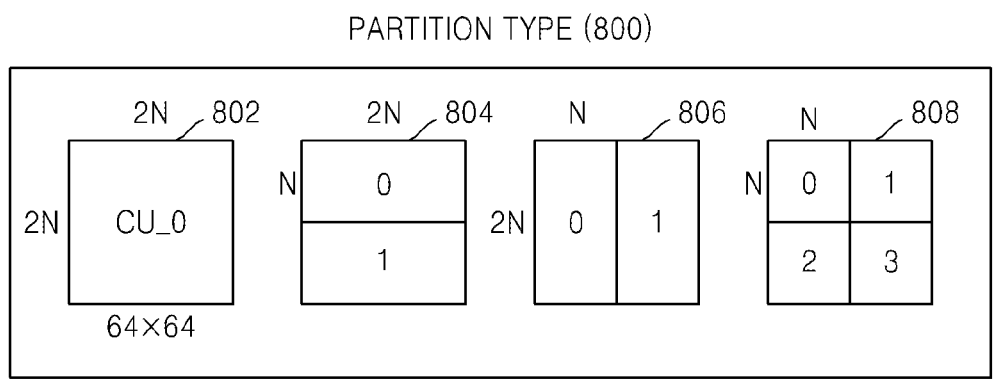
FIG. 13 is a diagram for describing encoding information of coding units corresponding to a coded depth according to an exemplary embodiment.
Figure 13:
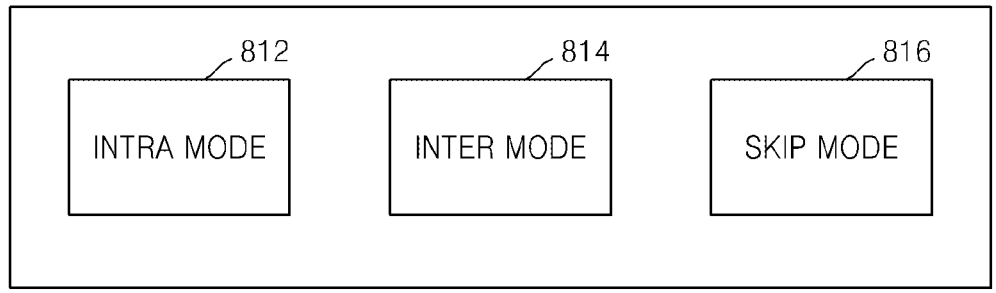
Figure 13:
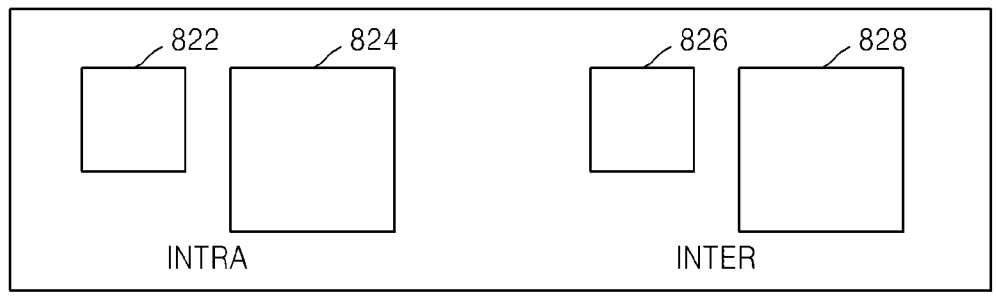

FIG. 13 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a type of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 802 having a size of 2N×2N, the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates the size of a transformation unit to be based on when transformation is performed on a current coding unit. For example, the transformation unit may be a first intra transformation unit 822, a second intra transformation unit 824, a first inter transformation unit 826, or a second intra transformation unit 828.

The image data and encoding information extractor 220 of the video decoding apparatus 200 may extract and use the information 800, 810, and 820 for decoding.

Figure 14:
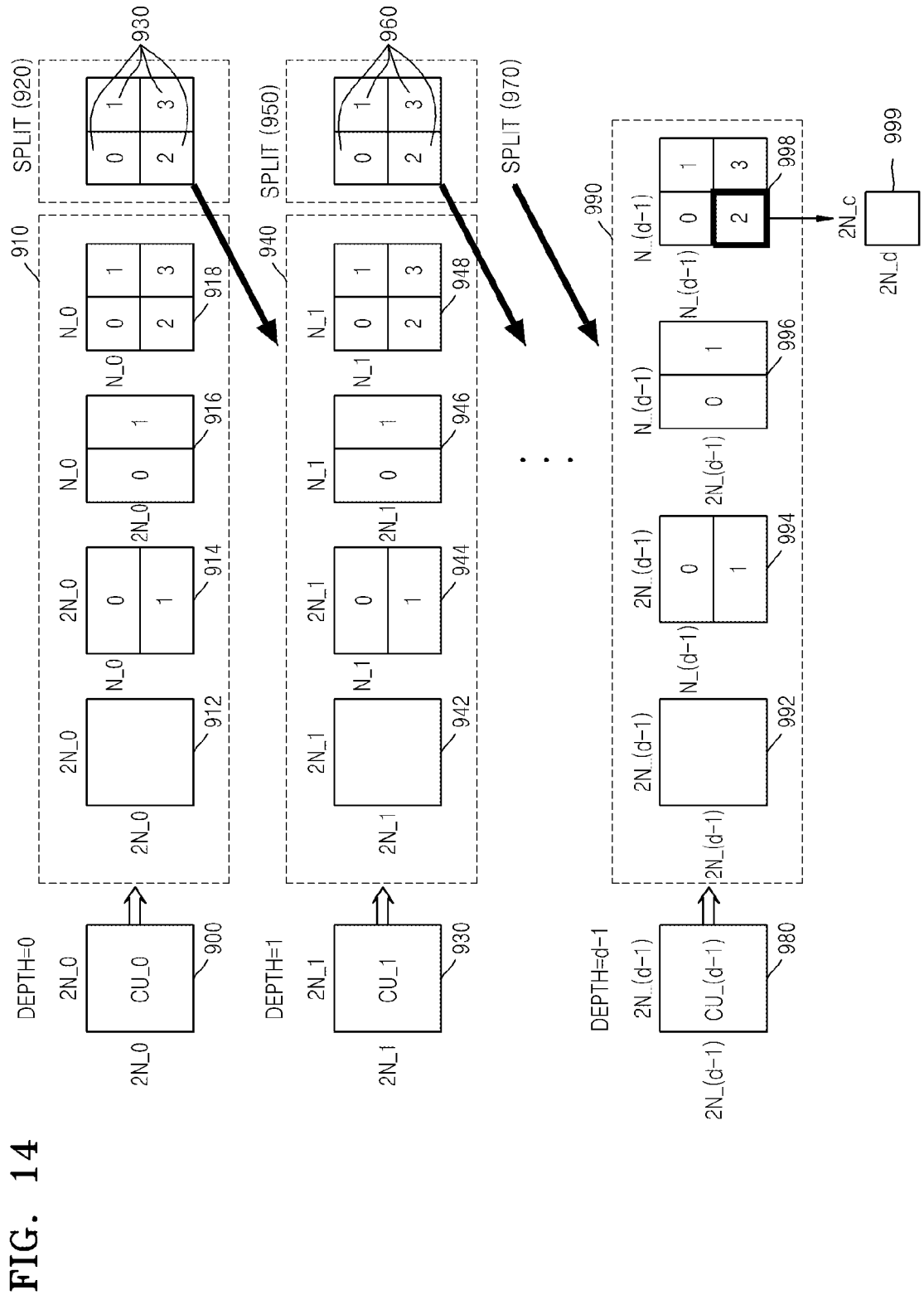
FIG. 14 is a diagram of deeper coding units according to depths, according to an exemplary embodiment.

FIG. 14 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include, for example, asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 may include partitions of a partition type 942 having a size of 2N_1×2N_1, a partition type 944 having a size of 2N_1×N_1, a partition type 946 having a size of N_1×2N_1, and a partition type 948 having a size of N_1×N_1. Here, the size of 2N_1×2N_1 of the partition type 942 is the same as the size of N_0×N_0 of the partition type 918.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, coding units according to depths may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N0_(d−1) may include partitions of a partition type 992 having a size of 2N_(d−1)×2N_(d−1), a partition type 994 having a size of 2N_(d−1)×N)_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1, two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the coding unit 900 may be determined to be N_(d−1)×N_(d−1). Also, since the maximum depth is d and a minimum coding unit 980 having a lowermost depth of d−1 is no longer split to a lower depth, split information for a coding unit 980 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 15:
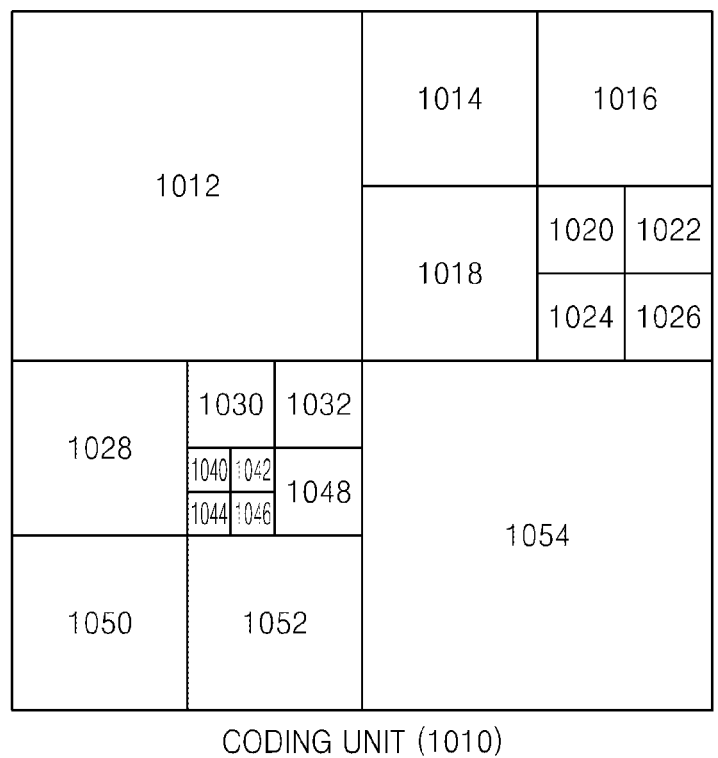
FIGS. 15 through 17 are diagrams for describing a relationship between coding units, prediction units, and transformation units according to an exemplary embodiment.
Figure 16:
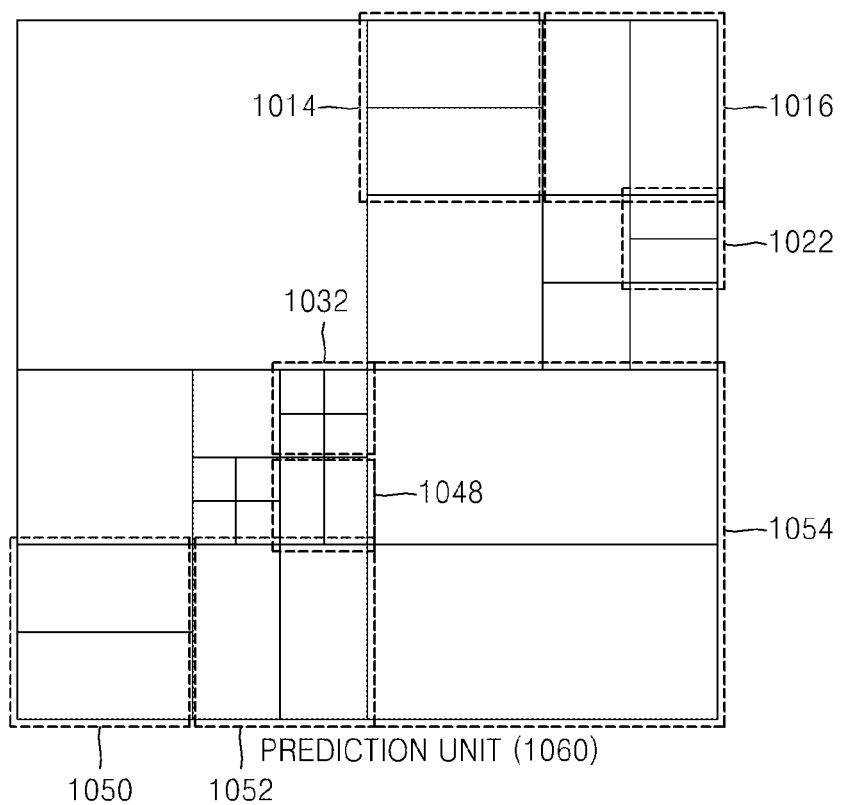
Figure 17:
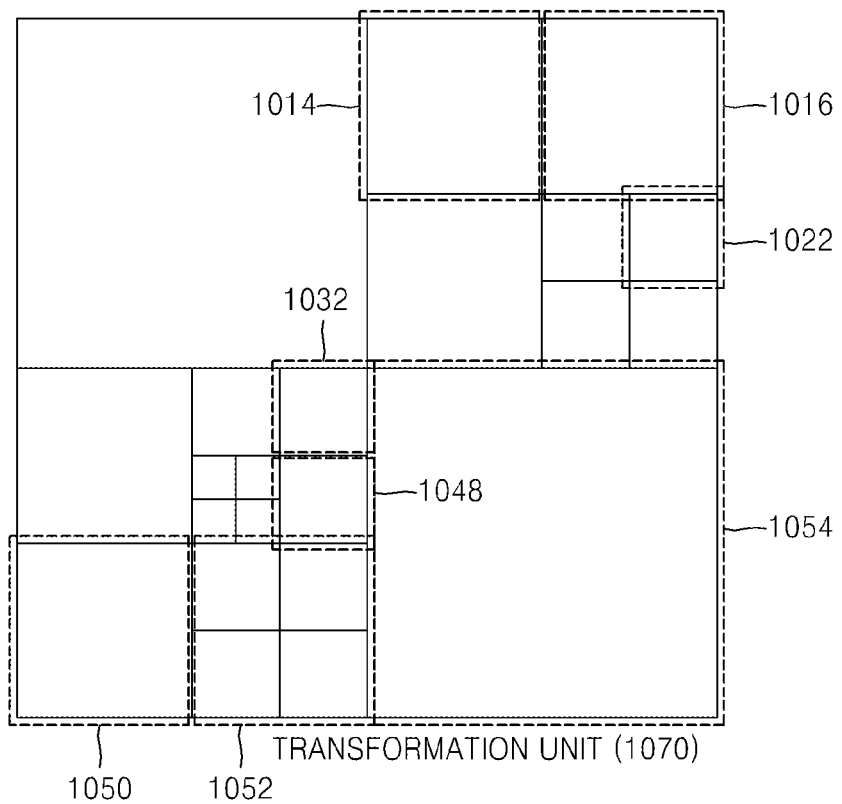

FIGS. 15, 16, and 17 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some coding units 1014, 1016, 1022, 1032, 1048, 1050, 1052, and 1054 are split into partitions for prediction encoding. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the apparatuses 100 and 200.

TABLE 1

| Split Information 0 (Encoding on Coding unit having Size of 2N × 2N and Current Depth of d) | | | | | Split Information 1 |
|---|---|---|---|---|---|
| Prediction Mode | Partition Type | | Size of Transform Unit | | Repeatedly Encode Coding Units having Lower Depth of d + 1 |
| Intra Inter Skip (Only 2N × 2N) | Symmetrical Partition Type | Asymmetrical Partition Type | Split Information 0 of Transform Unit | Split Information 1 of Transform Unit | |
| | 2N × 2N 2N × N N × 2N N × N | 2N × nU 2N × nD nL × 2N nR × 2N | 2N × 2N | N × N (Symmetrical Type) N/2 × N/2 (Asymmetrical Type) | |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 18:
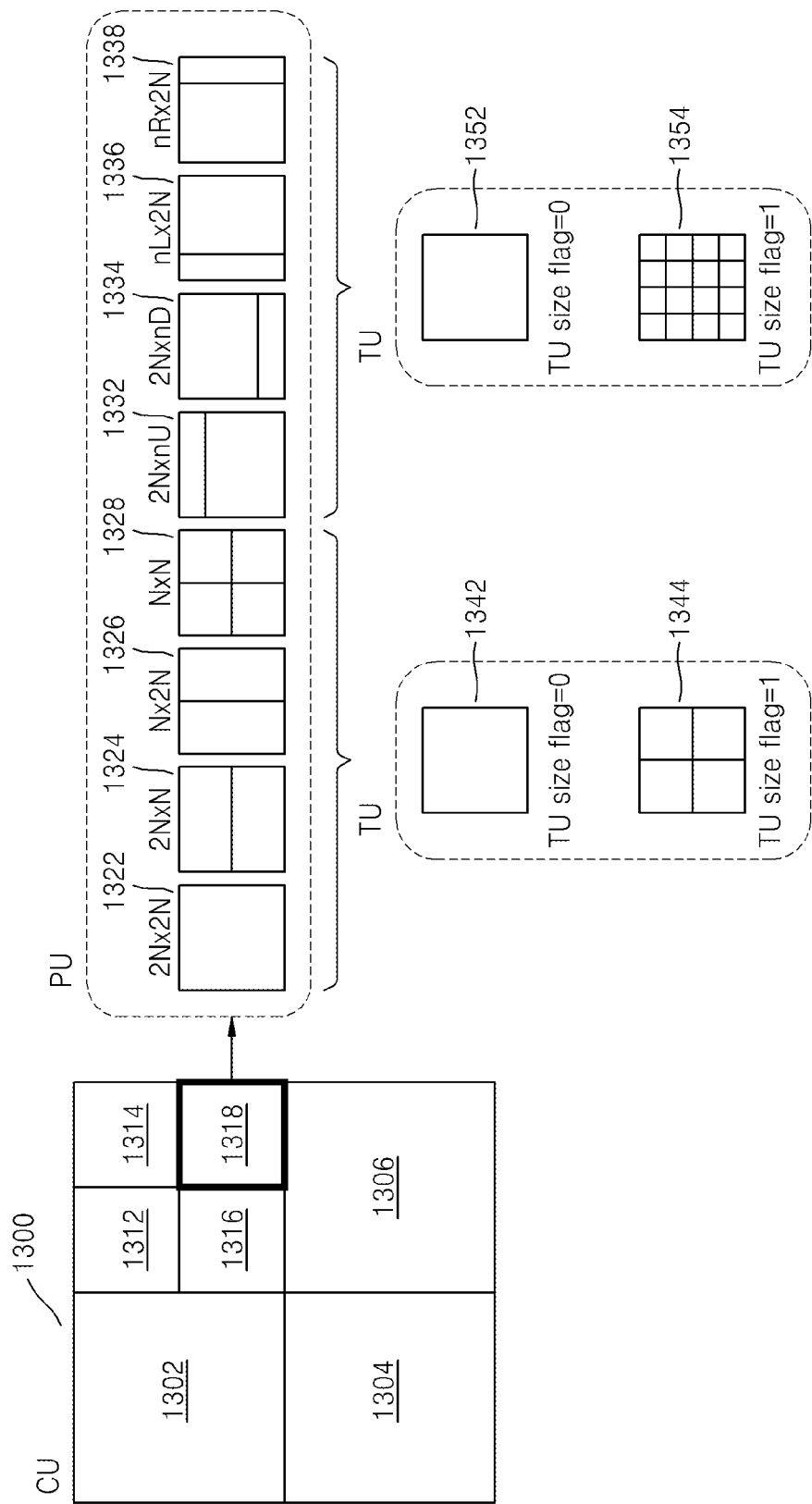
FIG. 18 is a diagram for describing a relationship between a coding unit, a prediction unit or a partition, and a transformation unit according to encoding mode information of Table 1.

FIG. 18 is a diagram for describing a relationship between a coding unit, a prediction unit or a partition, and a transformation unit, according to encoding mode information of Table 1. A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Transformation unit split information, i.e., a Tu size flag, is a type of a transformation index. The size of a transformation unit corresponding to the transformation index may vary according to a prediction unit type or a partition type of a coding unit.

For example, when the partition type is set to be symmetrical, i.e., the partition type 1322, 1324, 1326, or 1328, a transformation unit 1342 having a size of 2N×2N is set when the TU size flag is '0', and a transformation unit 1344 having a size of N×N is set when the TU size flag is '1'.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 18, the TU size flag is a flag having a value or 0 or 1 but is not limited to a 1-bit flag, and a transformation unit may be hierarchically split while the TU size flag increases to 0, 1, 2, 3, . . . . The TU size flag may be used as an exemplary embodiment of the transformation index.

In this case, the size of a transformation unit that has been actually used may be expressed by using a TU size flag of a transformation unit, according to an exemplary embodiment, together with a maximum size and minimum size of the transformation unit. According to an exemplary embodiment, the video encoding apparatus 100 may encode maximum transformation unit size information, minimum transformation unit size information, and a maximum TU size flag. The result of encoding the maximum transformation unit size information, the minimum transformation unit size information, and the maximum TU size flag may be inserted into an SPS. According to an exemplary embodiment, the video decoding apparatus 200 may decode video by using the maximum transformation unit size information, the minimum transformation unit size information, and the maximum TU size flag.

For example, if the size of a current coding unit is 64×64 and a maximum transformation unit size is 32×32, then the size of a transformation unit may be 32×32 when a TU size flag is 0, may be 16×16 when the TU size flag is 1, and may be 8×8 when the TU size flag is 2.

As another example, if the size of the current coding unit is 32×32 and a minimum transformation unit size is 32×32, then the size of the transformation unit may be 32×32 when the TU size flag is 0. Here, the TU size flag cannot be set to a value other than 0, since the size of the transformation unit cannot be less than 32×32.

As another example, if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMin}Tu\text{Size}=\max(\text{MinTransformSize},\text{Root}Tu\text{Size}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size obtained by splitting the maximum transformation unit size 'RootTuSize', when the TU size flag is 0, a number of times corresponding to the maximum TU size flag, and 'MinTransformSize' denotes a minimum transformation size. Thus, a smaller value from among RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{Root}Tu\text{Size}=\min(\text{MaxTransformSize},PU\text{Size}) \quad (2)$$

That is, if the current prediction mode is the inter mode, the transformation unit size 'RootTuSize' when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize=\min(MaxTransformSize, PartitionSize) \qquad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example, and exemplary embodiments are not limited thereto.

According to a video encoding method performed based on coding units having a tree structure described above with reference to FIGS. 6 to 18, image data in the spatial domain is encoded for each of the coding units having the tree structure. According to a video decoding method performed based on coding units having a tree structure, image data in the spatial domain is restored by decoding maximum coding units to restore a picture and/or a video that is a picture sequence. The restored video may be reproduced using a reproducing apparatus, may be stored in a recording medium, or may be transmitted via a network.

Also, an offset parameter may be signaled in units of pictures, slices, maximum coding units, coding units having a tree structure, prediction units of a coding unit, or transformation units of a coding unit. For example, a maximum coding unit having the least error with respect to the original block may be restored by adjusting restored pixel values of maximum coding units by using offset values restored based on received offset parameters of the maximum coding units.

The embodiments may be written as computer programs and can be implemented in general-use digital computers that execute the programs using a computer readable recording medium. Examples of the computer readable recording medium include magnetic storage unit media (e.g., read-only memory (ROM), floppy disks, hard disks, etc.) and optical recording media (e.g., compact disc read-only memories (CD-ROMs), or digital versatile discs (DVDs)).

According to exemplary embodiments, overflow may be substantially prevented when fixed-point transformation is performed during a video decoding process, thereby saving hardware resources for performing clipping.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

The invention claimed is:

1. A method for decoding a video, the method comprising:
obtaining transformed coefficients of a block from a bitstream comprising a coded picture;
generating inverse-quantized transformed coefficients by performing inverse-quantization, wherein the performing inverse-quantization includes performing a right bit-shifting operation using a base-2 logarithm of a size of the block, and by performing a first clipping on the transformed coefficients, wherein the first clipping is performed after the performing the inverse-quantization and before performing an inverse transformation including at least one of a vertical inverse-transformation and a horizontal inverse-transformation;
generating inverse-transformed coefficients by performing the vertical inverse-transformation on the inverse-quantized transformed coefficients;
generating sample values by performing scaling and a second clipping on the inverse-transformed coefficients; and
generating residual values by performing the horizontal inverse-transformation on the sample values,
wherein the first clipping is performed for restricting the inverse-quantized transformed coefficients to a range corresponding to a first bitdepth,
the second clipping is performed for restricting the sample values to a range corresponding to a second bitdepth, and
the scaling comprises performing a bit shift operation to the right by N bits and the scaling is performed before the second clipping,
wherein the coded picture is hierarchically split into at least one coding unit according to split information, and one of the at least one coding units includes the block.

2. The method of claim 1, wherein the first bitdepth is equal to 16 bits.

3. The method of claim 1, wherein the second bitdepth is equal to 16 bits.

4. The method of claim 1, wherein N is equal to 7.

* * * * *